(12) United States Patent
Peters et al.

(10) Patent No.: US 10,217,255 B2
(45) Date of Patent: Feb. 26, 2019

(54) AUTOMATIC CREATION OF AXIS BREAK ENHANCING CHART VISUALIZATION

(71) Applicant: SAP SE, Walldorf (DE)

(72) Inventors: Geoffrey Neil Peters, Vancouver (CA); Vincent Teng, Coquitlam (CA); Navjot Singh, Vancouver (CA); Brandon Pun, Coquitlam (CA); Christina Obry, Vancouver (CA)

(73) Assignee: SAP SE, Walldorf (DE)

( * ) Notice: Subject to any disclaimer, the term of this patent is extended or adjusted under 35 U.S.C. 154(b) by 227 days.

(21) Appl. No.: 15/182,432

(22) Filed: Jun. 14, 2016

(65) Prior Publication Data

US 2017/0358112 A1  Dec. 14, 2017

(51) Int. Cl.
*G06T 11/20* (2006.01)
*G06F 3/0482* (2013.01)
*G06F 17/24* (2006.01)

(52) U.S. Cl.
CPC .......... *G06T 11/206* (2013.01); *G06F 3/0482* (2013.01); *G06T 11/203* (2013.01)

(58) Field of Classification Search
CPC ..... G06T 11/206; G06T 11/203; G06F 3/0482
USPC ................... 345/440, 440.1, 440.2, 441, 442
See application file for complete search history.

(56) References Cited

PUBLICATIONS

A. Blakeston, "Broken Column and Bar Charts", https://alesandrab.wordpress.com/2014/03/17/broken-column-and-bar-charts, Mar. 17, 2014.*
Mekko Graphics, "Using Axis Breaks in Charts", https://www.youtube.com/watch?v=c3yZON0ghvg, 3:02 minutes, Jun 9, 2016.*
Mekko Graphics, "How to Make a Cascade (Waterfall) Chart"; https://www.youtube.com/watch?v=7PBO_TmmODY&t=263s, 6:59 minutes, published on May 17, 2016.*

\* cited by examiner

*Primary Examiner* — Jin Cheng Wang
(74) *Attorney, Agent, or Firm* — Fountainhead Law Group P.C.

(57) ABSTRACT

Embodiments automatically create an axis break in a bar chart or waterfall chart to promote data visualization. For a bar chart with positive bars, a maximum axis break point is determined relative to a lowest datapoint (D1) in the selected bar(s). A minimum axis break point is found from a value (D2) outside selection which is between D1 and zero, and which is closest to D1. The inclusion of padding on either side of a break prevents the break from lying at zero or a bar end. A different procedure creates axis breaks in a waterfall chart. Certain embodiments store only bar selection metadata with a chart. The location of the axis break then is recalculated each time the chart is rendered (e.g., with updated data). Embodiments may retain axis break data for reference in various stages of a user interaction (e.g., filtering/expanding, drilling-down/up, etc.) with a rendered chart.

16 Claims, 25 Drawing Sheets

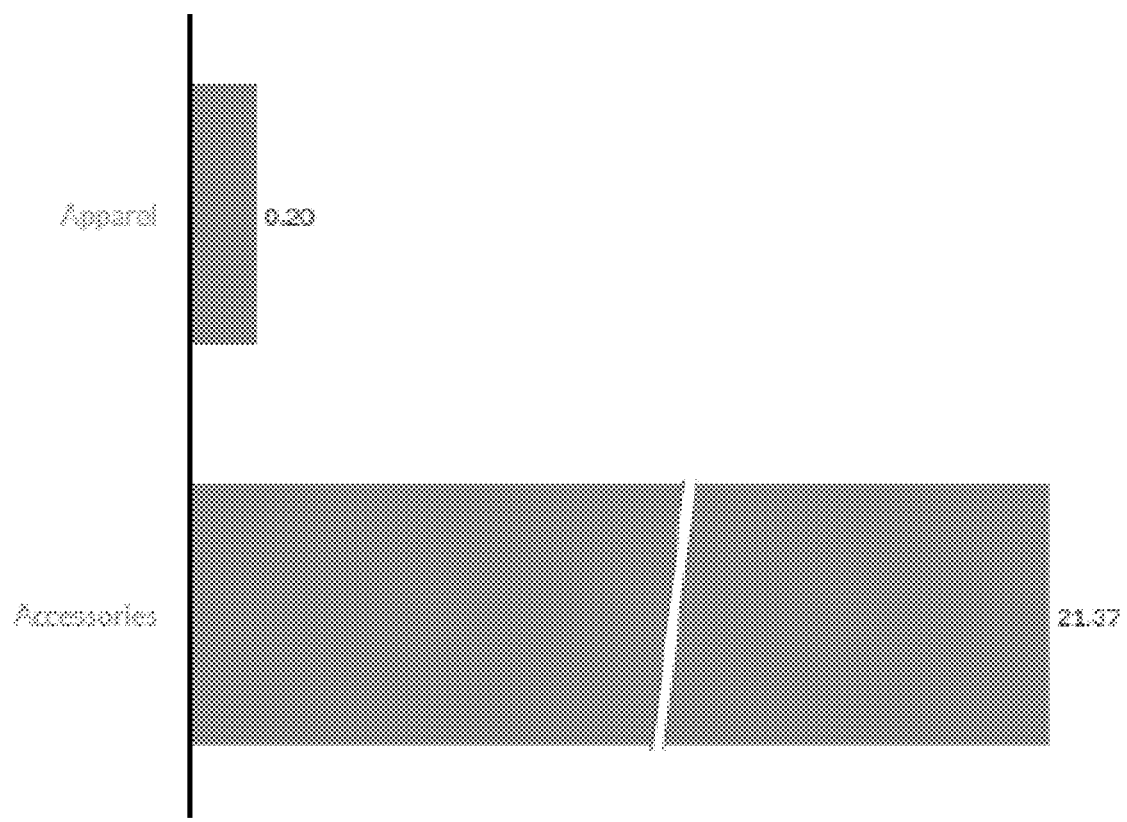
FIG. 14
FIG. 15
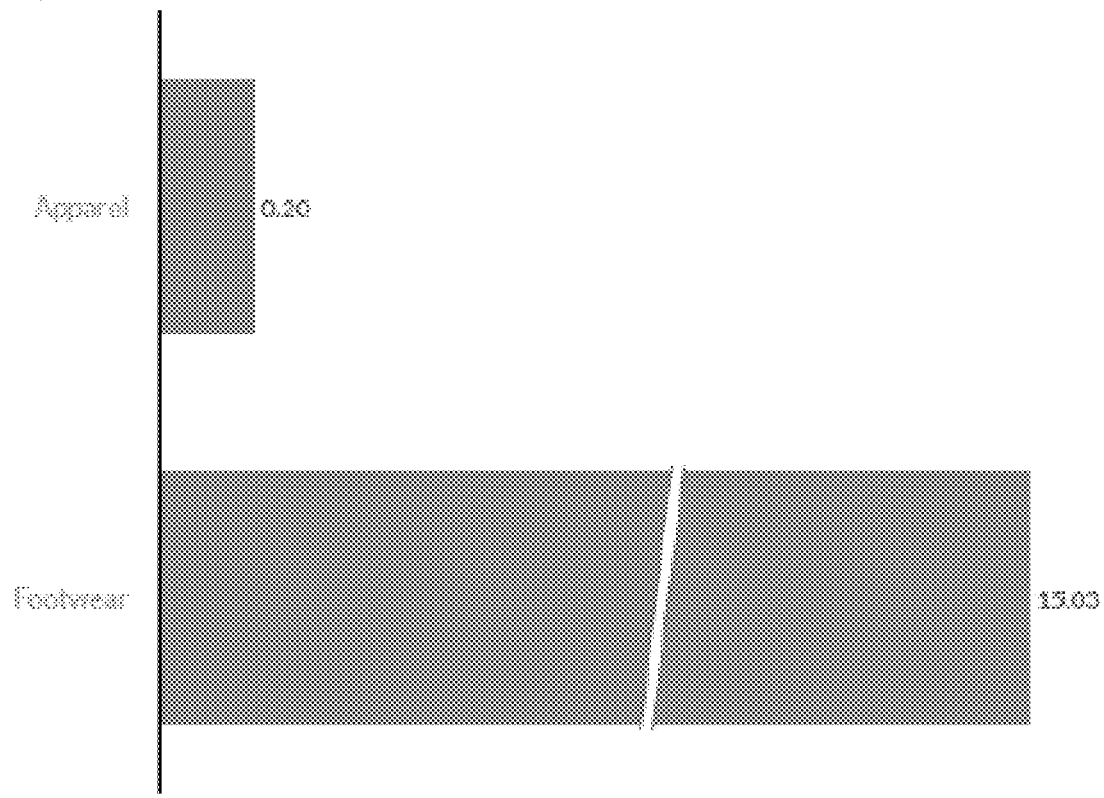

```
[
  {
    "entityId": {
      "id": "parentId",
      "type": "hierarchy.pch",
      "dimension": "sap.epm:Product",
      "parentKey": {
        "id": "planning:[TENANT_TEST][][\\/sap.epm\\/ProfitAndLoss_qs]",
        "type": "dataset"
      }
    },
    "memberValue": "[sap.epm:Product].[parentId].&[HPRD0002]",
  },
  {
    "entityId": {
      "id": "parentId",
      "type": "hierarchy.pch",
      "dimension": "sap.epm:Product",
      "parentKey": {
        "id": "planning:[TENANT_TEST][][\\/sap.epm\\/ProfitAndLoss_qs]",
        "type": "dataset"
      }
    },
    "memberValue": "[sap.epm:Product].[parentId].&[HPRD0003]",
  }
]
```

FIG. 16

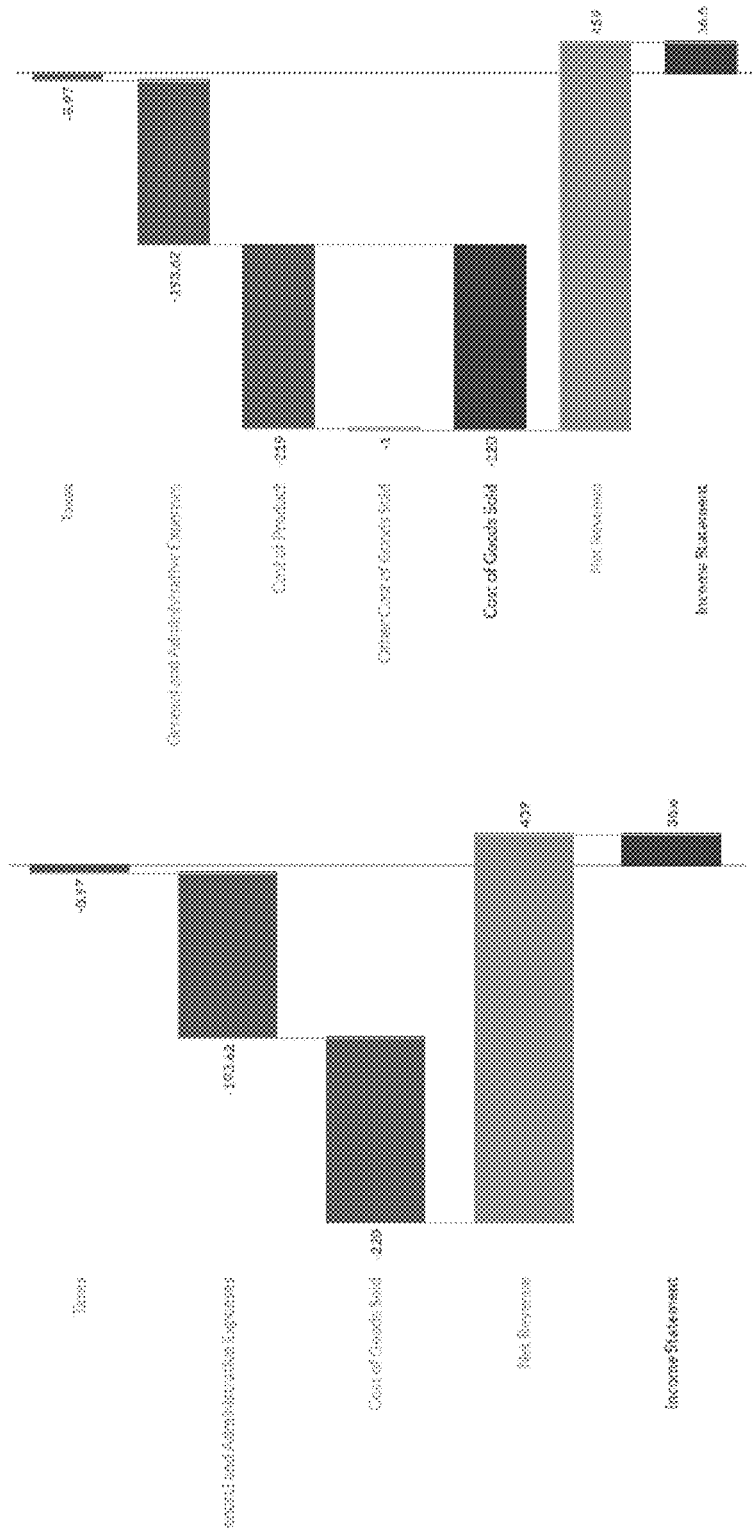

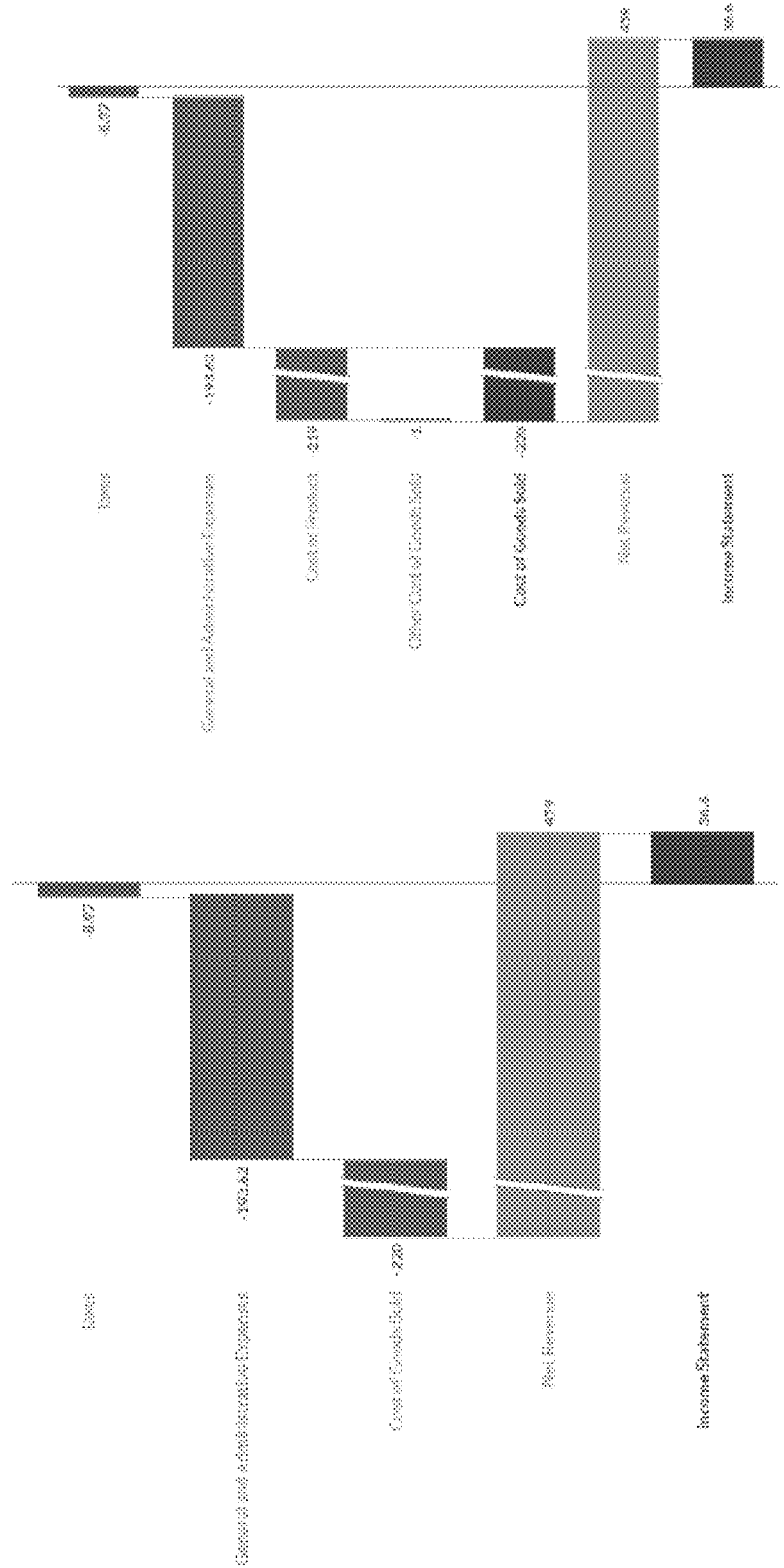

AUTOMATIC CREATION OF AXIS BREAK ENHANCING CHART VISUALIZATION

BACKGROUND

Unless otherwise indicated herein, the approaches described in this section are not prior art to the claims in this application and are not admitted to be prior art by inclusion in this section.

Embodiments relate to user interfaces visualizing stored data, and in particular, to methods and apparatuses that automatically create a break in a chart axis in order to enhance data visualization.

Databases and overlying applications referencing data stored therein, offer a powerful way of storing and analyzing complex related data. In particular, through the skillful presentation of data in the form of tables and charts, a user can describe complex issues and the factual and forecast data underlying those issues.

Stored data may be effectively visualized using a variety of chart formats in order to afford insight to a user. In some cases, coarse disparities or similarities in the magnitude of stored data values may mask fine-grained but important differences between them.

One example is where the values of each of a plurality of data points is in the thousands, but key differences between those data points are only in the single digits. In such a situation, a chart visualizing the data points may allocate excessive resources to depicting the large (1000's) overall magnitudes of the data values, without providing sufficient visual information to allow the user to appreciate small (single digit) differences arising between those values being visualized.

Another example may involve outlier data whose overall values differ significantly from the other data points being visualized. In such a situation, a chart visualizing all of the data points together may allocate excessive resources to depicting the large overall magnitudes of difference between the outlier(s) and the remaining data points, such that the user is unable to appreciate small differences.

Conventional approaches may allow a user to manually alter a chart in order to enhance data visualization, by inserting a break along an axis. Such a break reduces an amount of space allocated to certain common or exceptional (outlier) data values, thereby emphasizing contrast with the data sought to be visualized.

However, such manual insertion of chart axis breaks can be time consuming and labor intensive, as the user is tasked with assessing relative magnitudes and then interacting with the display. This burden on the user may become especially heavy where a large number of data points are to be visualized and/or the data is often updated, calling for frequent manual intervention.

SUMMARY

Embodiments automatically create an axis break in a bar chart or waterfall chart to promote data visualization. For a bar chart (all bars starting from zero), a maximum axis break point is determined relative to a lowest datapoint (D1) in the selected bar(s). A minimum axis break point is found from a value (D2) lying outside the selection which is between D1 and zero, and which is also closest to D1. Inclusion of a padding value on either side of an axis break prevents that break from lying at zero or at a bar end.

For a waterfall chart (having bars starting from endpoints of previous bars), selection of a single bar (B1) results in the maximum range for the axis break being determined by comparing an endpoint of B1 (either the top or bottom of B1) with D1'. The point D1' is the nextmost top or bottom of another bar overlapping B1, searching towards the other endpoint of B1. This process is performed from both endpoints of B1 in order to determine the larger of the axis break ranges, and the largest is chosen. A padding value is also included.

Where multiple bars of a waterfall chart are selected, max and min axis break points are determined from a region (B2) of the largest selected bar that overlaps with all possible other selected bars. That overlap bar region B2 may be determined in an iterative fashion.

Certain embodiments may store only metadata corresponding to data points of selected bars with a chart. The location of the axis break then is recalculated each time the chart is rendered (e.g., with updated data).

A user may conduct various interactions (e.g., filtering/filter removal, drilling-down/up, etc.) with a chart rendered with an axis break. Embodiments may retain axis break information for reference at various stages during chart interaction.

The following detailed description and accompanying drawings provide a better understanding of the nature and advantages of embodiments.

BRIEF DESCRIPTION OF THE DRAWINGS

FIGS. 9-15 illustrate examples of creating axis breaks in bar charts.

FIG. 16 shows a sample JSON chart selection.

FIGS. 17-29 illustrate examples of creating axis breaks in waterfall charts.

FIG. 30 illustrates hardware of a special purpose computing machine configured to create chart axis breaks according to an embodiment.

DETAILED DESCRIPTION

Described herein are methods and apparatuses that automatically create a break in a chart axis to enhance visualization of plotted data. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments automatically create an axis break in a bar chart or waterfall chart to promote data visualization. For a bar chart, a maximum axis break point is determined relative to a lowest datapoint (D1) in the selected bar(s). A minimum axis break point is found from a value (D2) outside selection which is between D1 and zero, and which is closest to D1. The inclusion of padding on either side of a break prevents the break from lying at zero or a bar end. A different procedure creates axis breaks in a waterfall chart. Certain embodiments store only bar selection metadata with a chart. The location of the axis break then is recalculated each time the chart is rendered (e.g., with updated data). Embodiments may retain axis break data for reference in various stages of a user interaction (e.g., filtering/expanding, drilling-down/up, etc.) with a rendered chart.

Figure 1:
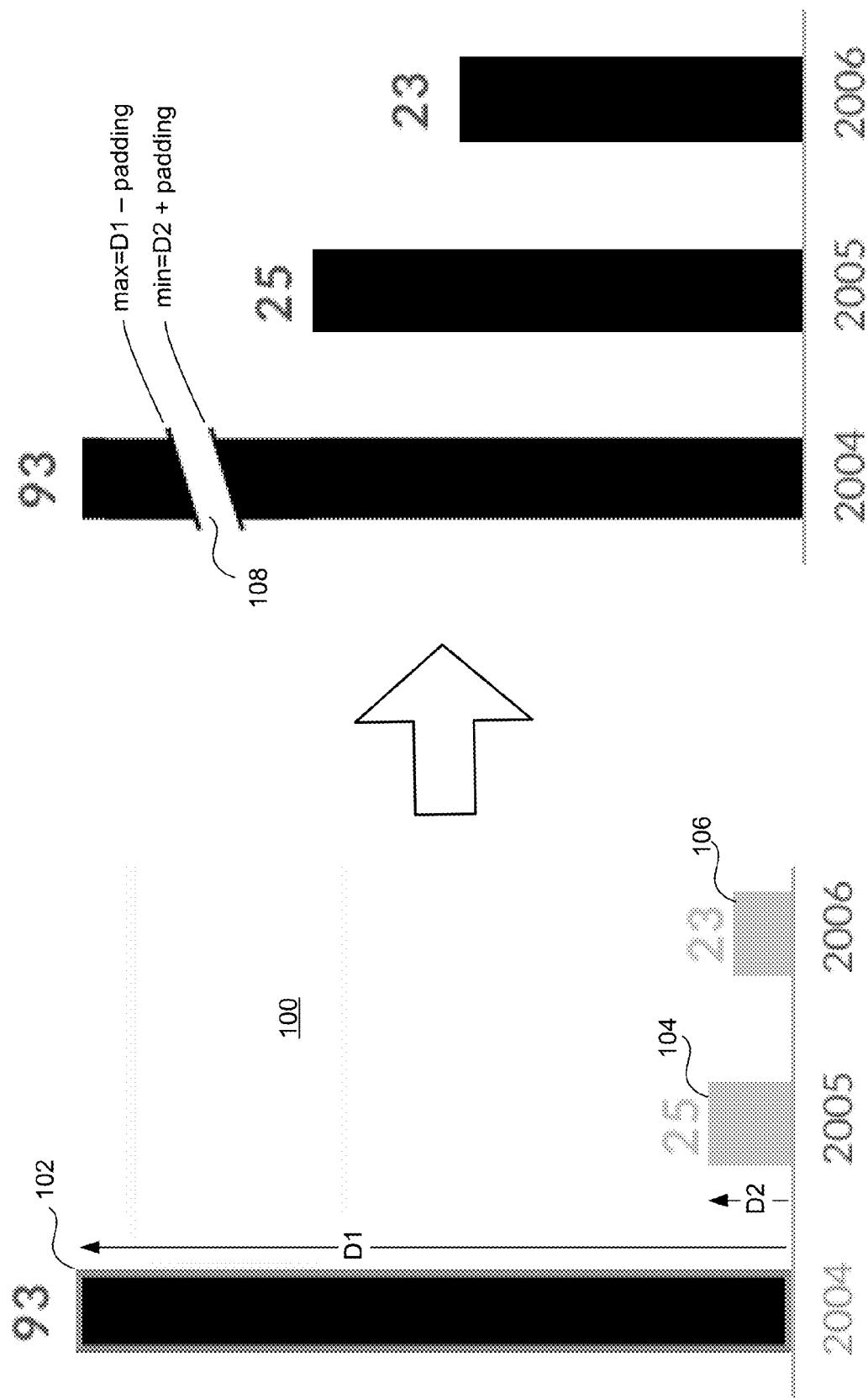
FIG. 1 presents a simplified illustration of the creation of an axis break in a bar chart according to an embodiment.

FIG. 1 presents a simplified illustration of the creation of an axis break in a bar chart according to an embodiment. Here, the bar chart 100 comprises a first bar 102 representing an outlier having a magnitude substantially greater than the remaining bars 104, 106 of the bar chart.

Accordingly, the vertical axis of the bar 102 is to be automatically broken in order to promote user visualization of the other data points. The procedure for automatically imposing such an axis break is summarized as follows.

First, the user selects one or more bars to be broken. Owing to the importance of the zero axis in the bar chart visualization, it is not permitted for an axis break to include the zero axis. Hence, all bars that are selected must be either positive or negative.

If a mix of positive and negative bars are selected, then embodiments may automatically break either an axis of positive data or of negative data. This determination may be based upon one or more factors such as the number of selected positive and negative bars, and/or whether the largest selected bar is positive or negative.

The axis break procedure first looks for the data value in the selected bar (or bars), which has the value closest to zero. This first data value closest to zero, is referred to as D1.

Next, the procedure looks for the data value not in the selection:
which is between D1 and 0, and
which is closest to D1.

That data value is referred to as D2. If there is no candidate data value D2, then 0 is used for D2.

This determination of D1 and D2 represents a quantification of an amount of non-overlap between bar(s) selected for a break, and unselected bars not slated to have an axis break. In order to reduce this non-overlap and enhance an amount of space in the bar chart filled by the remaining (unselected) bars, the axis break is inserted in the region between D1 and D2.

Specifically, the procedure will then automatically insert the break between the following points: min=D2+padding, and max=D1−padding.

Thus, the maximum point axis break value is determined by the lowest datapoint in the selection. The minimum point axis break value is determined by the next highest value outside of the selection.

Here, the "padding" represents a minimum stand-off of the break from the ends of a bar. This "padding" term preserves the appearance of the chart, ensuring that a break cannot include a bar-end (which would be confusing for the viewer). The magnitude of the padding term can be a certain determined percentage (e.g. 10%) of the overall size of the chart axis.

FIG. 1 shows that with the axis break 108 inserted and a portion of the selected bar removed, the remaining bars expand in size to occupy the available space for the chart.

This enhances user appreciation of the remaining data points.

The simplified bar chart shown in FIG. 1 happens to have all positive numbers. Where an axis break is sought to be imposed on (all) negative bars selected in a bar chart, the procedure will instead insert a break where: min=D1+padding, and max=D2−padding.

Figure 2:
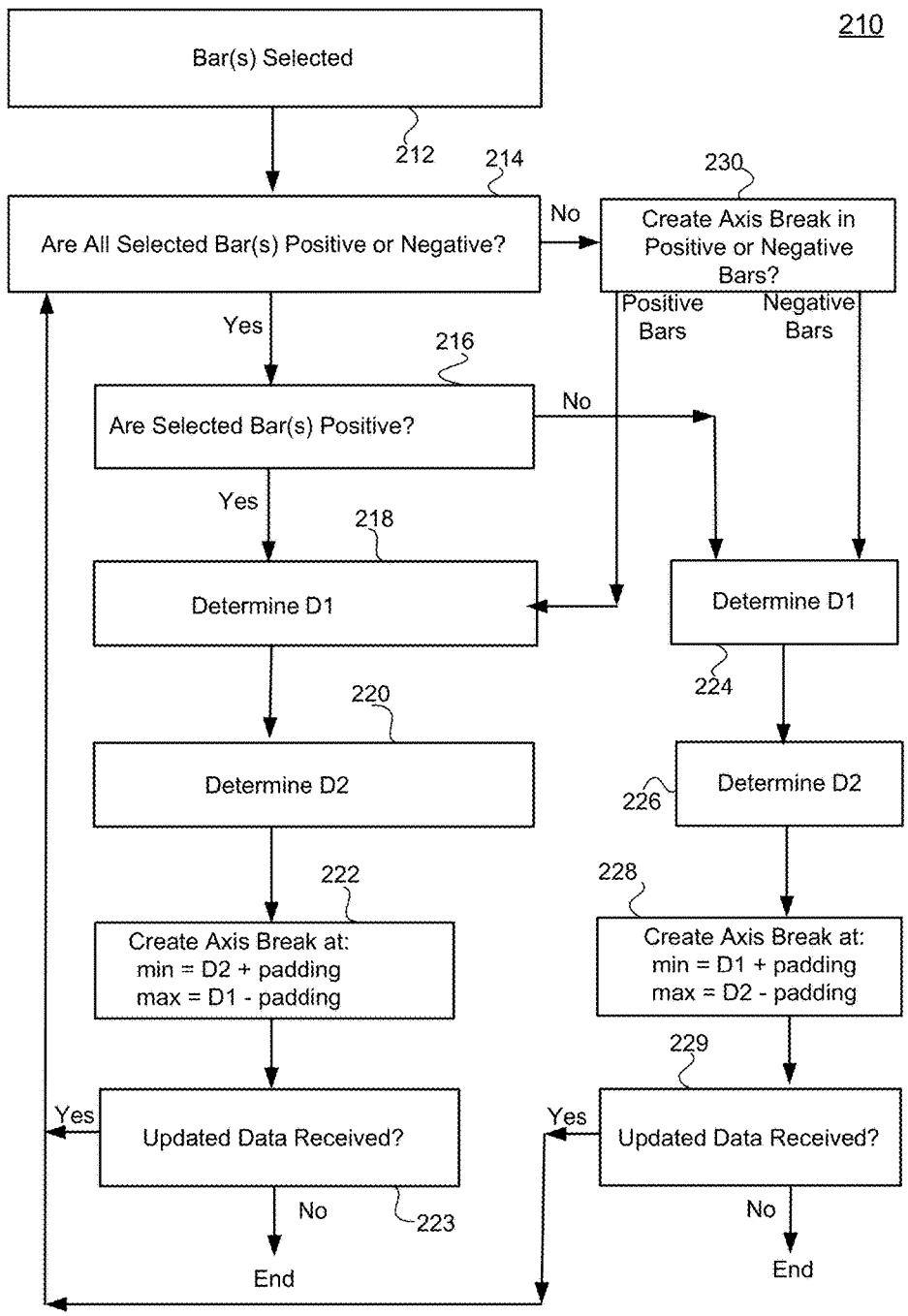
FIG. 2 presents a simplified flow diagram of a process of inserting an axis break in a bar chart according to an embodiment.

FIG. 2 presents a simplified flow diagram of a process 210 of inserting an axis break in a bar chart according to an embodiment. In a first step 212, bar(s) of a bar chart are selected for axis break creation.

In a second step 214 it is determined whether all selected bar(s) are positive or negative. If the selected bar(s) are positive or negative, then in step 216 it is determined whether all of the selected bar(s) are positive.

If positive, then D1 and D2 are determined in steps 218 and 220. In step 222, the axis break having a min and max is created as indicated.

In step 223, if updated data is received, the flow returns to the step 214 to re-create the axis break on the basis of the selected bars of the updated data. If no updated data is received, the process flow concludes.

If in step 216 all of the selected bars are not positive (e.g., are negative), then D1 and D2 are determined in steps 224 and 226. In step 228, the axis break having a min and max is created as indicated.

In step 229, if updated data is received, the flow returns to the step 214 to re-create the axis break on the basis of the selected bars of the updated data. If no updated data is received, the process flow concludes.

Returning to step 214, if a mixture of positive and negative bars are selected, then in step 230 it is determined whether the axis break is to be created positive or negative data. This determination may be based upon one or more factors, such as the number of selected positive and negative bars, and/or whether the largest selected bar is positive or negative.

If the axis break is to be imposed on positive data, then the flow proceeds to step 218. If the axis break is to be imposed on negative data, then the flow proceeds to step 224. Further details regarding creation of an axis break into a bar chart, are provided below.

In certain embodiments an axis break will be dynamically re-calculated each time the chart is rendered. Thus, only the user's selection of bar(s)—and not the calculated break range itself—need be persisted.

Within a chart being rendered, a UI may allow the user to perform certain interactions with the data. For example, as shown in the example below, a user may drill down into a rendered chart, filter a rendered chart, and/or remove (exclude) breaks from a rendered chart.

There, a user's original bar selection is maintained at each drill down level. Thus the user can drill down into the data and then drill back up, and the original selection may be referenced to re-create any breaks.

If part of the original selection is not present after user interaction with a chart (e.g., filtering removes a selected bar), the remaining selected bars may be used to re-calculate the break in the modified chart. The original break selection will not be affected. If user modification removes all of the selected bars, the break datapoints may still be persisted.

Regarding break removal, when a break is visible the user can click on any bar (not necessarily a bar that was in the original break selection), and choose "Remove break". This will remove the selected datapoint(s) used to generate the break.

Where a break is not visible (e.g., selected bar(s) are removed by filtering), then a UI control/icon may allow for manually clearing all axis breaks.

The bar chart represents a relatively simple chart format, where all bars are ensured to begin from a same point—the zero axis. A second chart type—the waterfall chart—presents a more complex case.

In a waterfall chart, a bar begins from the value of the previous bar. Despite this complexity, embodiments also provide a procedure allowing the insertion of axis breaks in a waterfall chart, as is now described.

For waterfall charts, when the user selects multiple bars, if all bars selected are overlapping, that the break should be inserted so that it spans all of the selected bars, but also eliminates the most empty space that these bars overlap. For non-overlapping bar(s), the procedure starts from the largest bar and breaks across all selected bars that overlap the largest bar in the selection. Bars not overlapping with the largest bar are ignored.

Details of the process are now provided. The user selects one or more bars of the waterfall chart.

Figure 3:
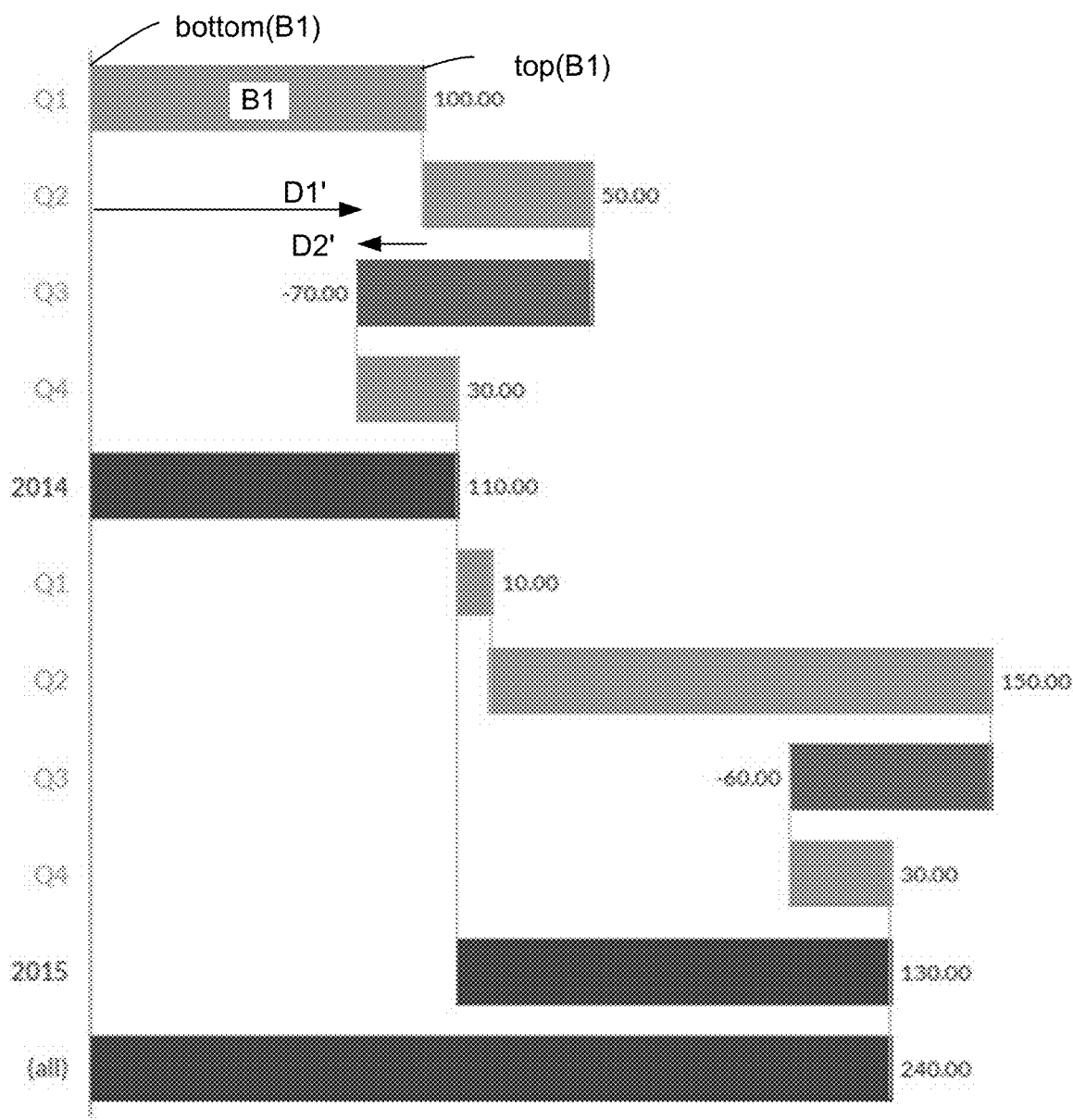
FIGS. 3-4 illustrate axis break creation involving the selection of a single bar in a waterfall chart

FIG. 3 shows an example of a waterfall chart. Here, the Q1 2014 bar of the waterfall chart is selected.

All selected bars must be on either the positive or negative side of the 0 axis. If the user selects a mix of positive and negative side bars, or if a selected bar spans the zero axis, the user cannot add a break since all breaks must stop at 0.

If a single bar was selected, that bar is referred to as B1. The bar B1 has a lower value of bottom(B1), and an upper value of top(B1). The lowest value of that bar Bottom(B1)=0, and the highest value of that bar top(B1)=100.

The procedure starts from bottom(B1), and looks upwards for the nextmost top or bottom of the other bar(s) that are also overlapping B1. That point is referenced as D1'.

Here, starting from 0 the procedure searches for the nextmost top or bottom of another bar that is also overlapping the bar B1. Two bars satisfy this condition: the bar Q3 2014, and the bar Q4 2014, both of which at 80. Therefore, the value D1'=80.

Next the procedure starts from the top(B1), and looks towards zero for the nextmost top or bottom of the other bar(s) that also are overlapping the bar B1. That point is referenced as D2'.

Here, starting from 100, the procedure searches towards zero for the nextmost end of another bar that is also overlapping B1. Here, the bars Q3 2014 and Q4 2014 end at 80. Therefore the value D2'=80.

In order to determine the axis break location, the situation where B1 is positive is considered first. If the distance from D1' to bottom(B1) is greater than the distance from D2' to the top(B1), then the axis break is inserted where: min=bottom(B1)+padding, and max=D1'−padding.

Otherwise, the break is inserted where: min=D2'+padding, and max=top(B1)−padding.

Here, the distances are calculated by the procedure as follows:
the distance from D1' to bottom(B1)=80−0=80
the distance from D2' to top(B1)=100−80=20.

Figure 4:
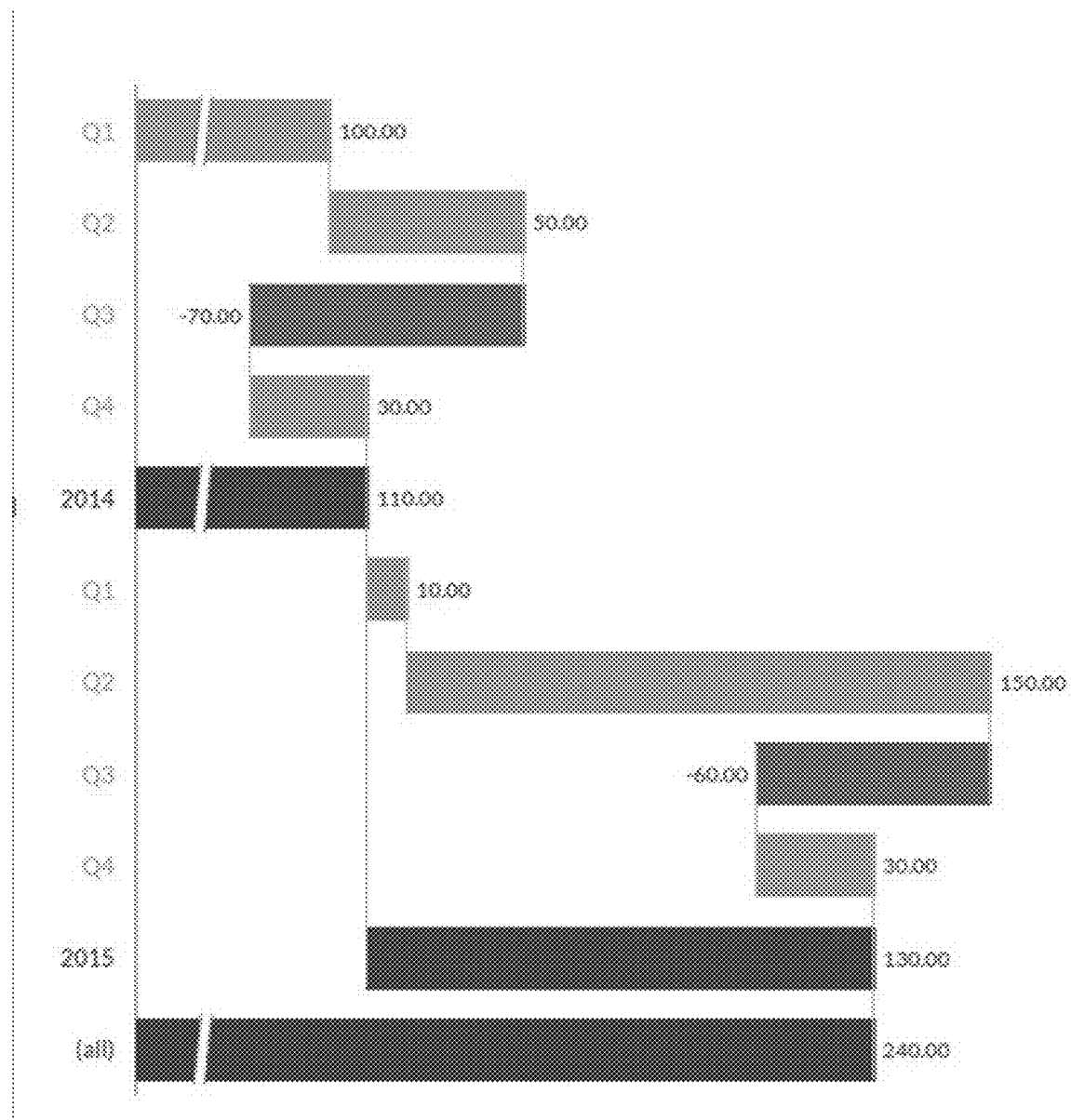

The first distance (80) is larger than the second distance (20). So, the procedure inserts the break from min to max, where min=0+padding, and max=80−padding (where padding is a certain percentage of the chart's axis range). FIG. 4 shows the resulting waterfall chart rendered with the axis broken.

The situation where B1 is negative, will operate symmetrically to the positive case.

Where multiple bars of a waterfall chart are selected, a similar process is used. Rather than using the bar B1, however, the process instead uses a bar region B2. That bar region B2 corresponds to the region of the largest selected bar, that overlaps with all possible other selected bars. Non-overlapping selected bars are ignored.

Figure 5:
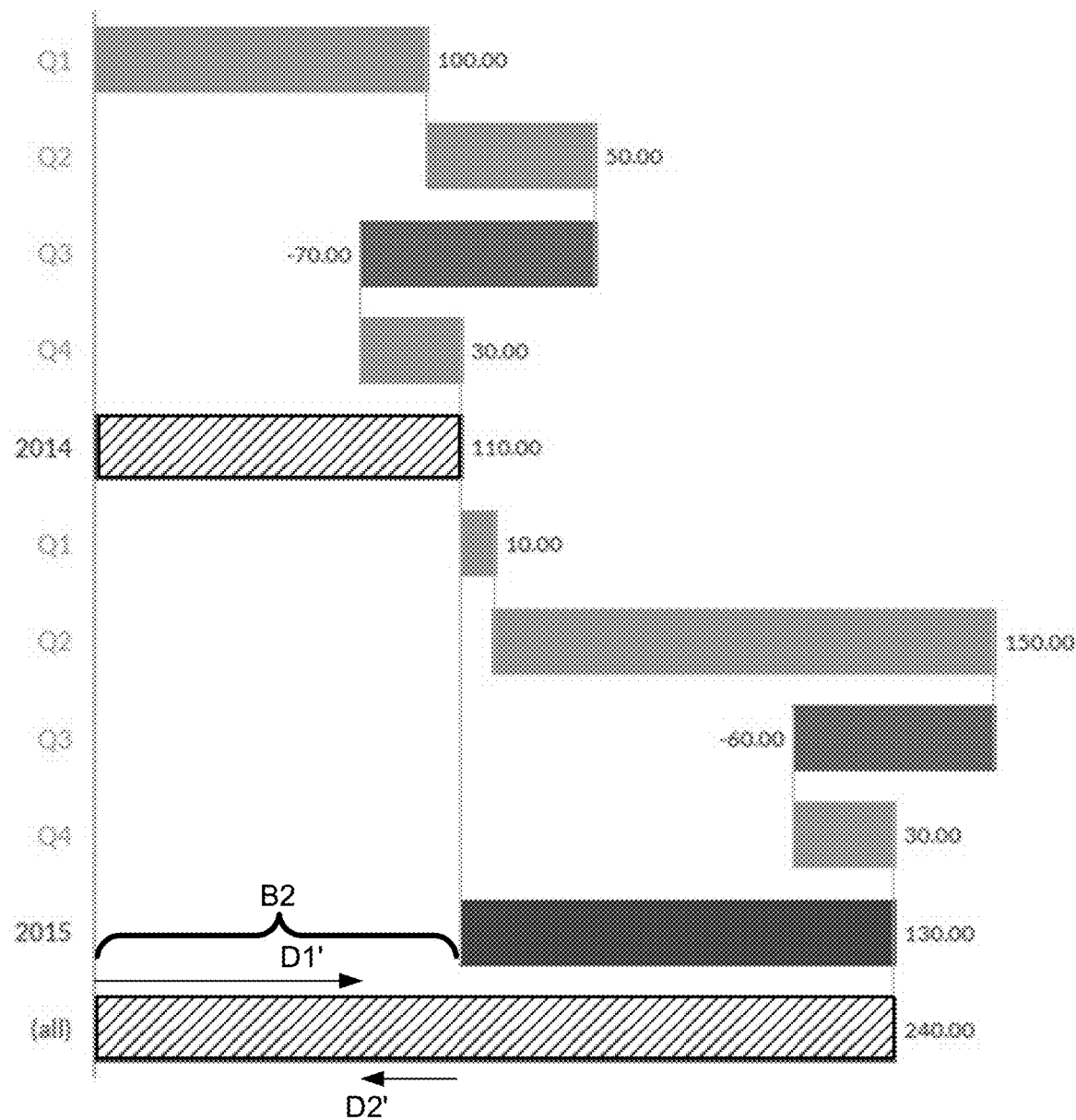
FIGS. 5-6 illustrate axis break creation involving the selection of multiple bars in a waterfall chart.
Figure 6:
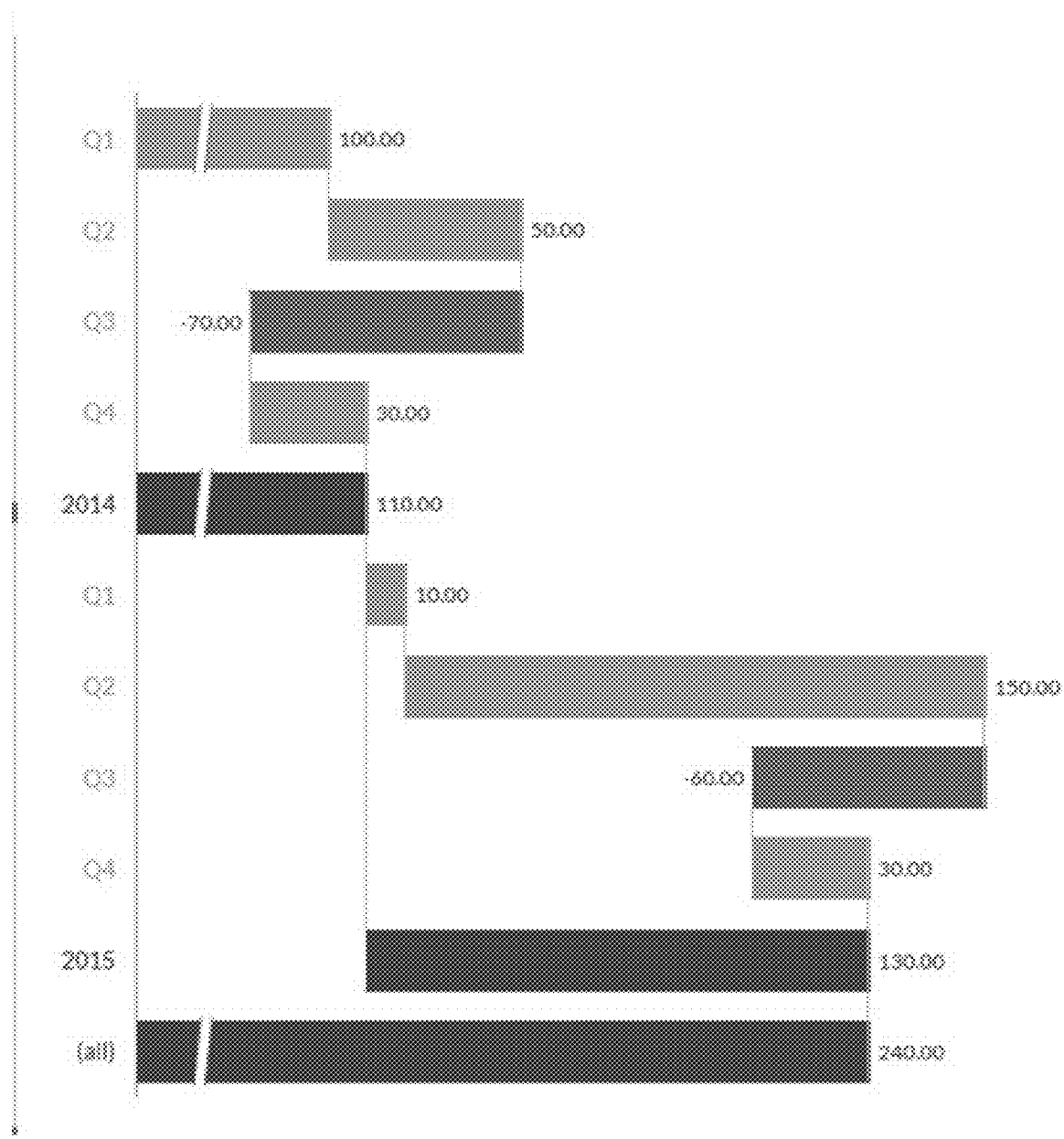

Axis break creation involving the selection of multiple bars in a waterfall chart, is now illustrated in connection with FIGS. 5-6. FIG. 5 shows a user selecting two overlapping bars—"2014" and "(all)"—having many other bars overlapping with them.

The procedure starts with the largest selected bar, which is (all). The other selected bar (2014) is determined to be overlapping with the largest selected bar.

The procedure next finds the overlapping region (B2) between the bars: (all) and 2014. This overlapping region B2 is from 0 to 110.

There are no other remaining selected bars. Thus, the procedure has calculated the region (B2) of the largest selected bar (all) that overlaps with all possible other selected bars, to be the region 0 to 110.

The axis break procedure then operates using B2 as the region to search for imposing a break: bar Bottom(B2)=0 and bar top(B2)=110.

Starting from 0, the procedure searches upwards for the nextmost end of another bar that is also overlapping B2. Here, those bars are Q3 2014 and Q4 2014 both of which end at 80. Therefore D1'=80.

Starting from 110, the procedure searches downward towards zero for the nextmost end of another bar that is also overlapping B2. These are the bars Q1 2014 and Q2 2014, which end at 100. Therefore D2'=100.

The distances are now calculated as follows:
distance from D1' to bottom(B2)=80−0=80.
distance from D2' to top(B2)=110−100=10.

Here, the first distance (80) is larger than the second distance (10). Thus the procedure inserts the break from min to max where min=0+padding, and max=80−padding, where padding is a certain percentage of the chart's axis range. FIG. 6 shows the resulting waterfall chart rendered with the axis broken.

Additional examples of the creation of axis breaks in waterfall charts under different scenarios, are provided below.

Figure 7:
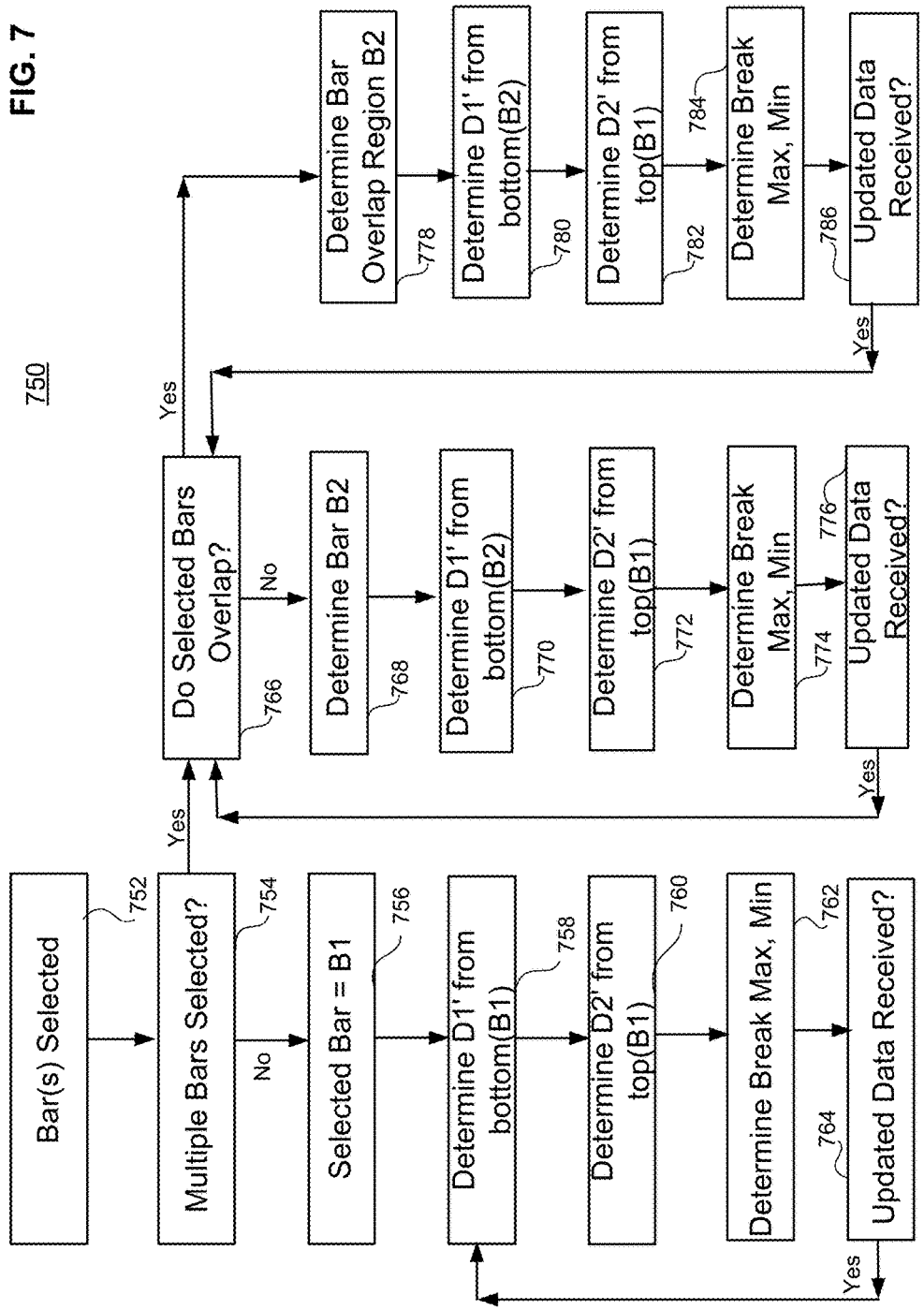
FIG. 7 presents a simplified flow diagram of a process of inserting an axis break in a waterfall chart according to an embodiment.

FIG. 7 is a simplified flow diagram showing a process 750 of inserting an axis break in a waterfall chart according to an embodiment. In a first step 752, one or more bars of a waterfall chart are selected.

In a second step 754, it is determined whether multiple bars are selected. If only a single bar is selected, in step 756 that single selected bar is established as B1.

In step 758, D1' is determined from the bottom(B1). In step 760, D2' is determined from the top(B1). In step 762, the max and min points of the axis break are determined from D1' and D2'.

If updated data is received in step 764, the process flow returns to step 758. Otherwise the process flow ends.

Returning to step 754, if multiple bars are selected, in step 766 the procedure determines whether the bars overlap. If the selected bars do not overlap, in step 768 the bar B2 may be determined from the multiple selected bars. This bar B2 may be determined based upon its having the largest size of the selected bars.

In step 770, D1' is determined from the bottom(B2). In step 772, D2' is determined from the top(B2). In step 774, the max and min points of the axis break are determined from D1' and D2'.

If updated data is received in step 776, the process flow returns to step 766. Otherwise the process flow ends.

Returning to step 766, if it is determined there that selected bars of the waterfall chart overlap, in step 778 a bar overlap region B2 is determined. That bar overlap region B2 corresponds to the region of the largest selected bar, that overlaps with all possible other selected bars. Non-overlapping selected bars are ignored.

The process of determining the bar overlap region B2 may be iterative in nature. That is, the procedure may cycle through the selected bars from largest to smallest, in order to determine the region of the selected having the overlap with the greatest number of other selected bars. An example of such an iterative process is described later below.

In step 780, D1' is determined from the bottom(B2). In step 782, D2' is determined from the top(B2). In step 784, the max and min points of the axis break are determined from D1' and D2'.

If updated data is received in step 786, the process flow returns to step 766. Otherwise the process flow ends.

The procedure for creating an axis break in a waterfall chart outlined above, offers certain benefits. For example, based upon a combination of one or more bars as input, the procedure produces a predictable result from an arbitrary waterfall chart.

Embodiments allow a user to break on a large segment of un-interrupted bars, achieving the goal of making the chart change in an appropriate manner when the axis break is performed. This can desirably eliminate in the chart, a range that does not contribute useful information. For example, a large outlier bar may be broken so that it doesn't prevent the consumer of the chart from appreciating or understanding more subtle changes or variances in bars not having such a large magnitude.

Figure 8:
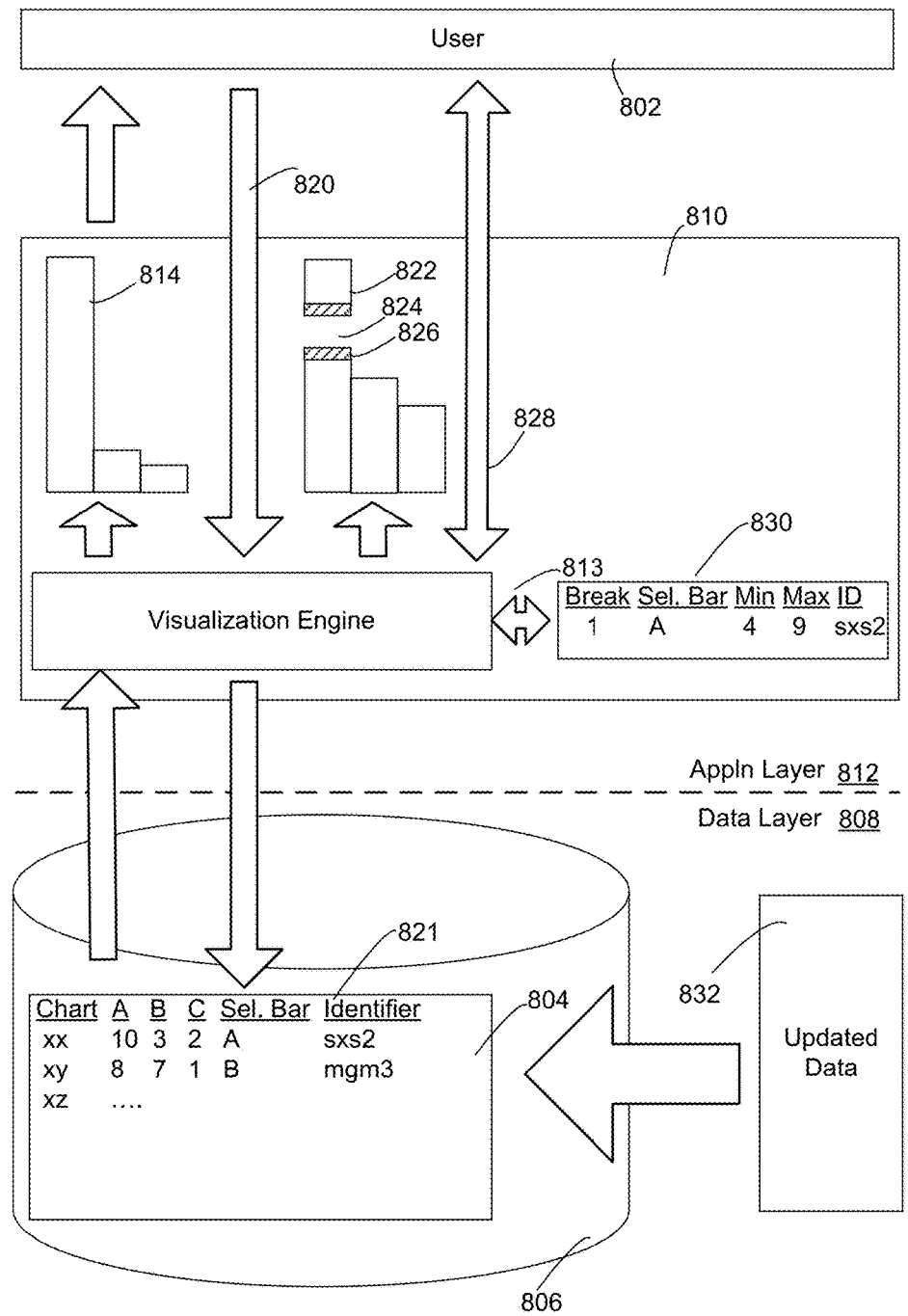
FIG. 8 is a simplified view of an embodiment of a system for creating chart axis breaks.

FIG. 8 is a simplified view of an embodiment of a system 800 configured to impose an axis break in a chart visualization according to an embodiment. User 802 is in communication with data stored within a database 806 of an underlying data layer 808, via visualization application 810 within an intervening application layer 812.

Specifically, in response to a user instruction, the visualization engine 813 of the visualization application renders a bar chart visualization 814 of data present in the database table 804. Data in that table identifies the specific bar chart including values for A, B, and C.

Upon reviewing that bar chart, the user decides to create an axis break. Here, the user recognizes that the large relative magnitude of A represents an outlier.

Accordingly, the user provides input 820 to the engine selecting the bar A for an axis break. The engine communicates this selected bar information to the underlying database table, for storage.

In particular, the database table is revised to include a per-bar identifier 821 of specific bar of the user's selection forming the basis for creating the axis break. Storing this per-bar identifier in the table preserves the selection for future reference by the visualization application engine. This identifier may be referenced, for example, where an axis break is to be re-calculated in a new chart that features updated data from the table.

Furthermore, based upon the input received from the user to make the selection, the engine produces a rendered bar chart visualization 822 which includes an axis break 824 characterized by a minimum point and a maximum point. The axis break further includes a padding portion 826 located on either side of the axis break.

The specific location of the axis point is determined based upon a procedure as described extensively herein. In particular, the engine determines values for various quantities that can include:
   points (e.g., D1, D2, D1', D2', bottom(B#), top(B#))
   bars (e.g., B1)
   bar regions (e.g. B2)
   distances and
   padding,
from values of the data stored in the underlying database table.

Based upon these values, the engine calculates min and max points for the appropriate axis breaks, and returns the rendered chart visualization including those axis breaks.

In order to accommodate user interaction 828 (e.g., filtering, drill-down/up) with the rendered visualization, the engine may store the axis break information in a local memory 830. Certain embodiments may persist this axis break information only temporarily, until the user interaction concludes and the user exits from the rendered chart. As mentioned above, however, the identity of bars selected by the user (as indicated by their per-bar identifiers), is retained in the axis break selection of the database for future reference.

In particular, the data table may be modified to reflect updated data 832 received in the data layer. To provide a visualization of that updated data, the engine re-calculates the axis break based upon the new data values and the stored selected bar information.

Further details regarding various embodiments are now provided in the following examples.

Examples—Bar Charts

Specific examples presented in the context of the BusinessObjects Cloud application available from SAP SE of Walldorf, Germany. In particular, FIG. 9 shows a screenshot illustrating creating an axis break in a bar chart by selecting a single bar.

Figure 9:
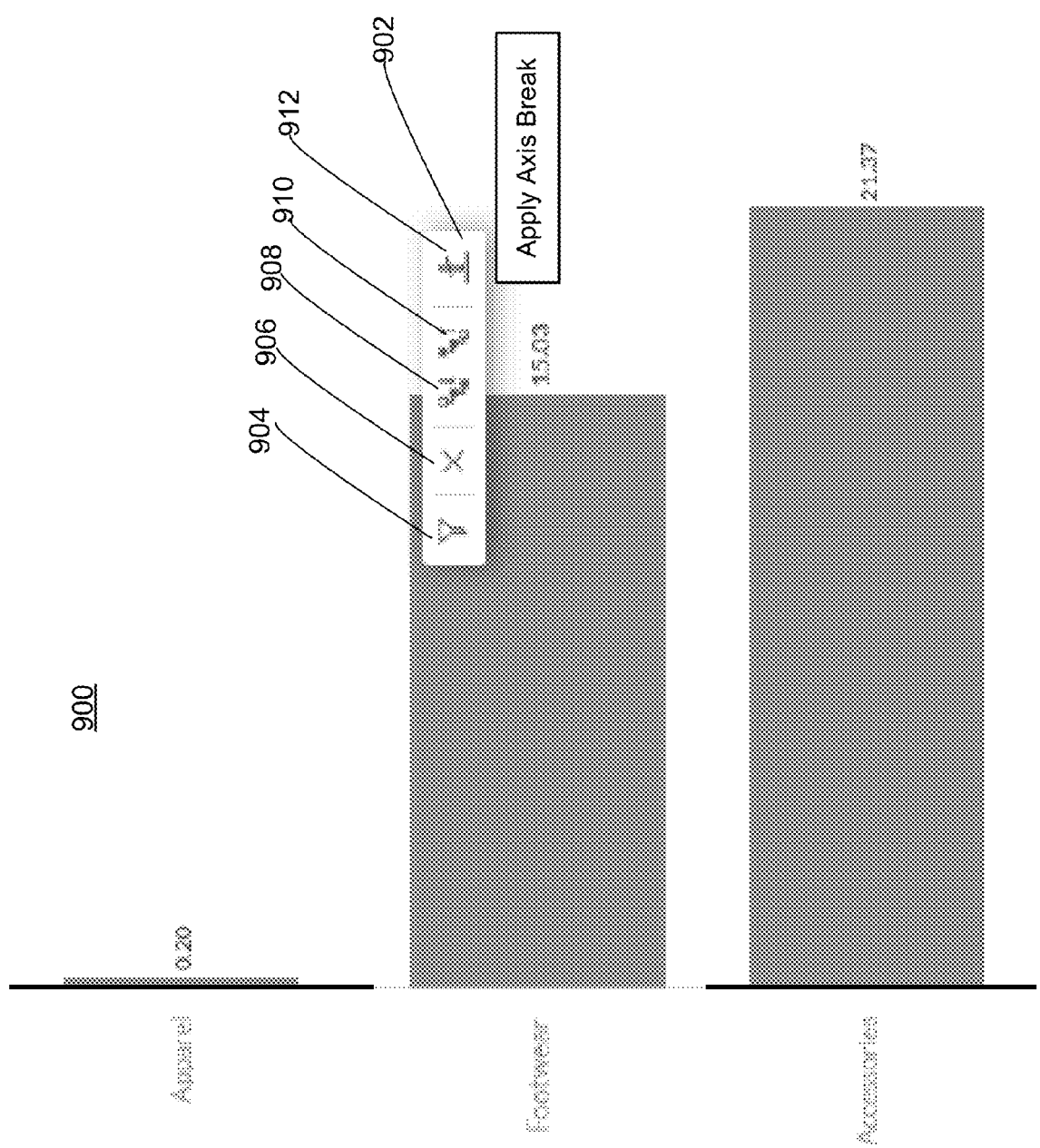

Here, FIG. 9 shows a bar chart 900 for an income statement per product, showing values for Apparel, Footwear, and Accessories. The user clicks on the footwear bar, activating a menu 902 including several icons for several possible interactions with the rendered chart.

For example, a filter icon 904 allows filtering on a selection according to a criteria. Exclude icon 906 is also shown allowing for the removal of an axis break from a bar. Drill down icon 908 and drill up icon 910 are further shown, allowing a user to explore bar chart data within a hierarchy.

Figure 10:
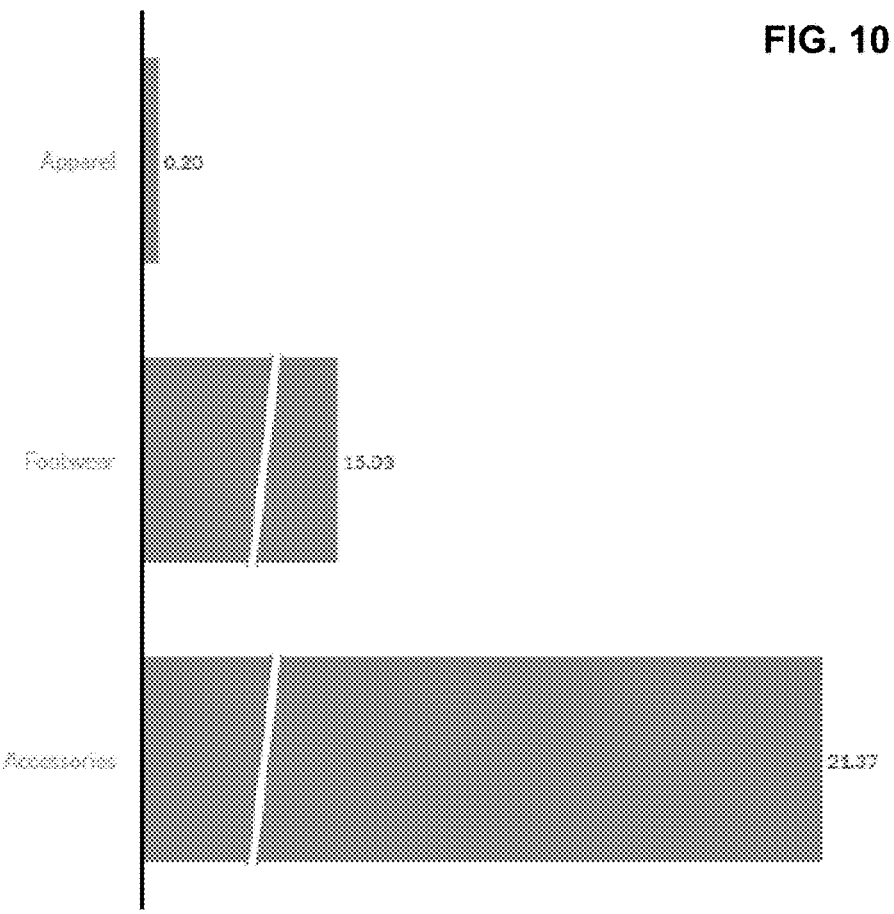

Here, the user chooses icon 912 to "Apply Axis Break". The footwear bar corresponds to bar ID: "[sap.epm:Product].[parentId].&[HPRD0002]". This bar ID is added to the axis break selection data for the chart. When the chart is saved, this axis break selection will be saved along with the chart. Now the axis break procedure is run given the user's selection, producing the chart of FIG. 10 with an axis break inserted.

Now, the user selects the Footwear bar (which retains the same ID) "[sap.epm:Product].[parentId].&[HPRD0002]", and chooses the option to filter out from the chart.

Figure 11:

After the filter is applied, the chart is redrawn as FIG. 11. It no longer includes this Footwear bar, which had ID "[sap.epm:Product].[parentId].&[HPRD0002]".

However, the Axis Break selection still has a single bar selected, of ID "[sap.epm:Product].[parentId].&

[HPRD0002]". Since none of the bars in the axis break selection are currently in the chart of FIG. 11, no axis break is rendered.

However, the axis break selection still contains the bar ID "[sap.epm:Product].[parentId].&[HPRD0002]" in the event the bar with that reappears in the chart at a later time during the course of further user interaction.

Now, the user removes the filter, and therefore no longer is excluding the Footwear bar. The chart now contains the Footwear bar again, which has the same ID as it did before, "[sap.epm:Product].[parentId].&[HPRD0002]". As the chart's axis break selection still contains a single bar with ID "[sap.epm:Product].[parentId].&[HPRD0002]", and this bar is now present, the axis break procedure will be run and the chart will again be rendered with an axis break inserted (as in FIG. 10).

Figure 12:
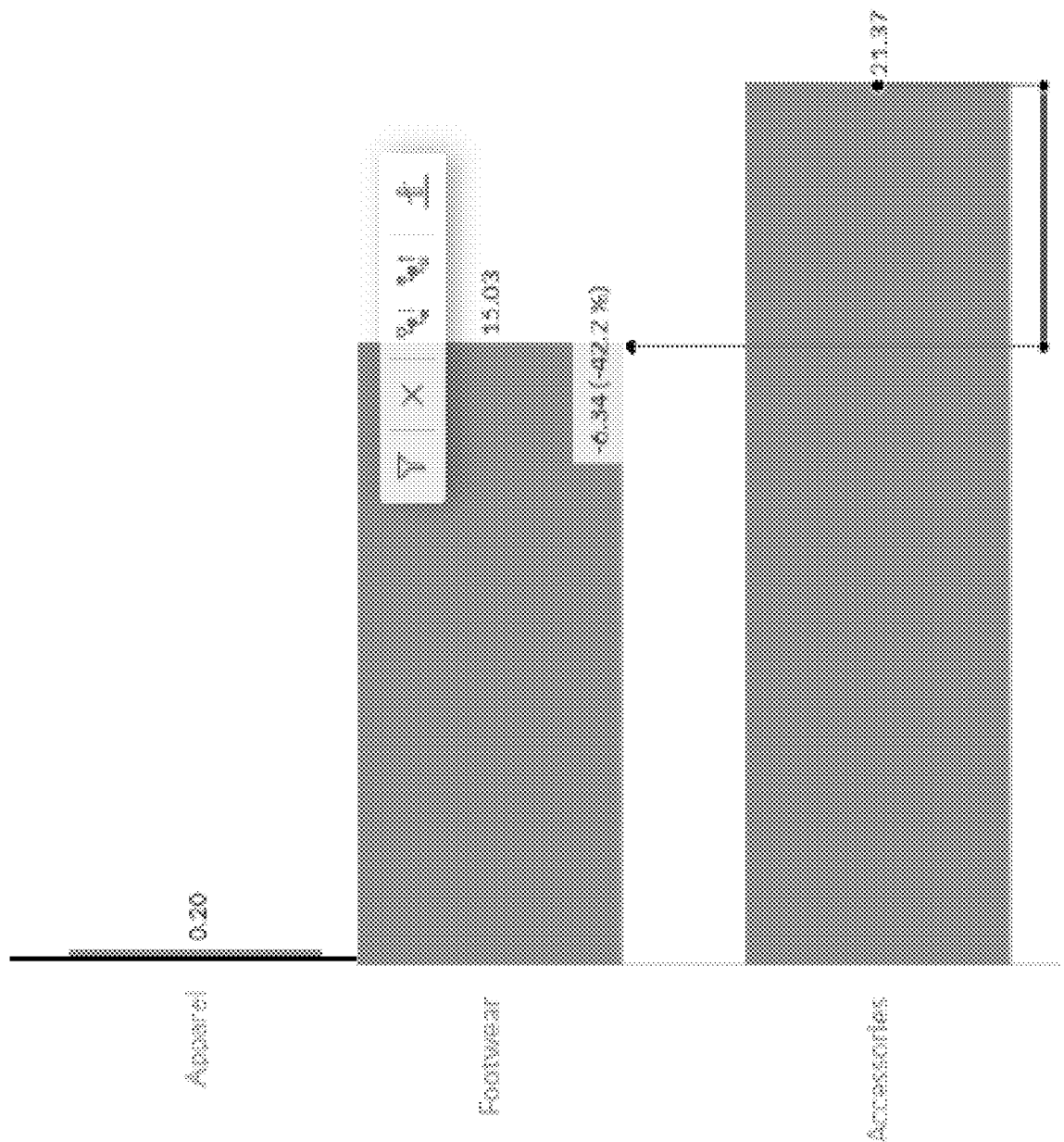

FIG. 12 illustrates another workflow in which an axis break is selected on the basis of two bars rather than one. Specifically, the user now selects two bars: Footwear and Accessories. These bars have bar IDs of: "[sap.epm:Product].[parentId].&[HPRD0002]" and "[sap.epm:Product].[parentId].&[HPRD0003]" respectively.

The user chooses Apply Axis Break on those bars from the menu in FIG. 12. As a result, these two bar ID's are added to the Axis Break selection data for the chart. When the chart is saved, this axis break selection will be saved along with the chart.

Figure 13:
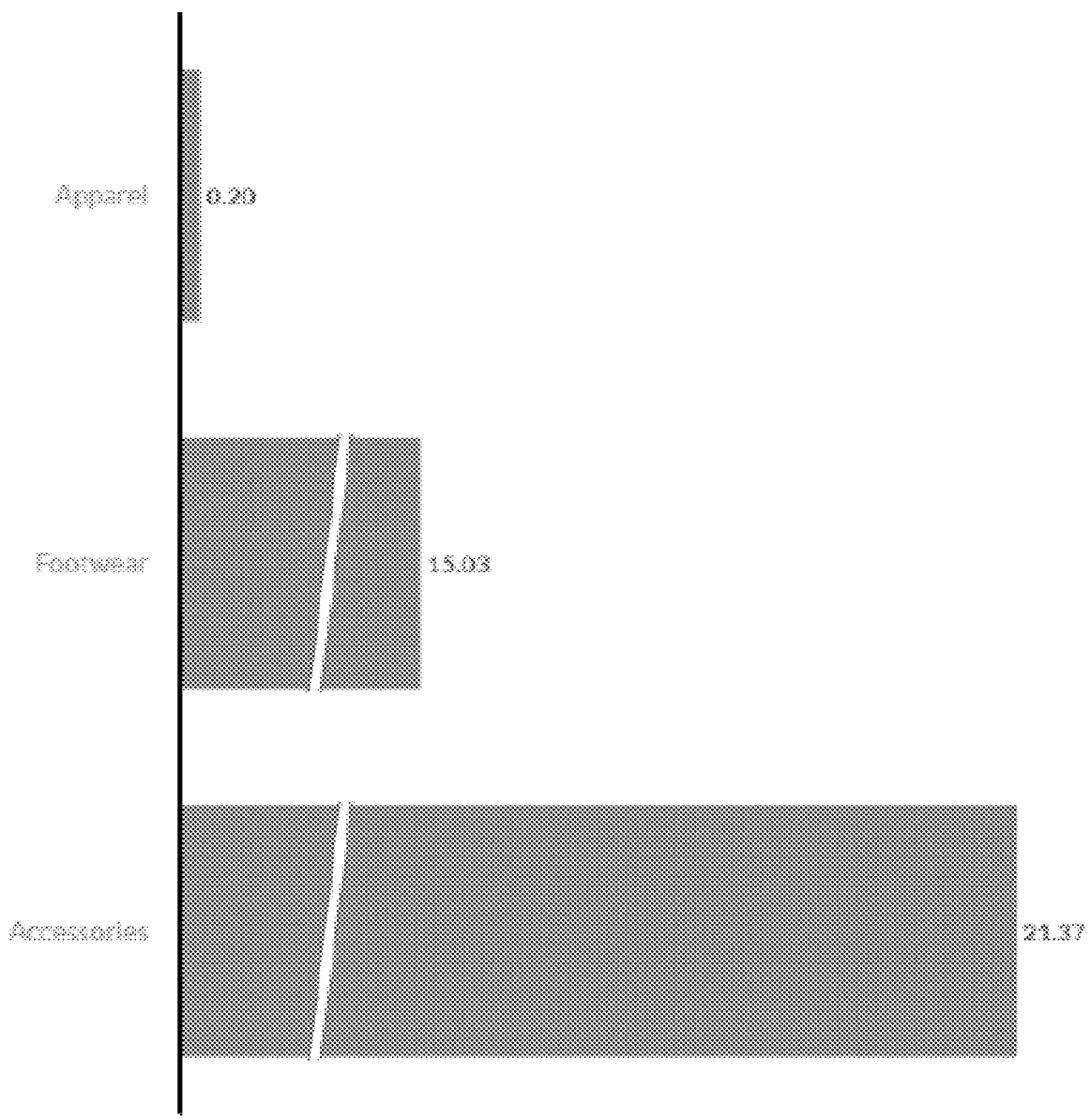

Now the axis break procedure is run given the user's selection. This produces the chart of FIG. 13 with an axis break inserted.

Next the user selects only the Footwear bar, and chooses the menu option to filter this bar from the chart. The Footwear bar has Bar ID "[sap.epm:Product].[parentId].&[HPRD0002]" and is no longer showing in the chart.

However, the Accessories bar "[sap.epm:Product].[parentId].&[HPRD0003]" remains present in the chart. Referencing the original the axis break selection (having both of the IDs) above, the Footwear bar is no longer in the chart but the Accessories bar is still in the chart. Therefore, the Accessories bar is used as selection input into the axis break procedure, and the axis break is automatically inserted into the chart shown in FIG. 14.

Next the user removes the filter exclusion on the Footwear bar, and instead adds a filter exclusion on the Accessories bar. In this case, the ID for Footwear bar is now present in both the chart and the axis break selection. The ID for the Accessories bar is no longer present in the chart, but is remains in the axis break selection.

As only bars in the axis break selection with ID's corresponding to bars in the chart can form the basis for an axis break, this case considers only the Footwear bar as input to the axis break procedure. The axis break procedure is run on the Footwear bar as a selection, and the break is inserted into the chart as shown in FIG. 15.

In the above workflow, the axis break selection may be represented as JavaScript Object Notation (JSON) that is copied from the visualization application. This JSON data is saved along with the other persisted data, in the model of the visualization.

Here, two bars (Footwear and Accessories) form the basis for the axis break selection. FIG. 16 shows a sample JSON with the IDs of the bars to which the break is applied.

Specifically, the entry with memberValue being: "[sap.epm:Product].[parentId].&[HPRD0002]" corresponds to the selection of the Footwear bar. That ID is used to uniquely represent and identify the Footwear bar.

The entry with the memberValue being: "[sap.epm:Product].[parentId].&[HPRD0003]" corresponds to the selection of the Accessories bar. That ID is used to uniquely represent and identify the Accessories bar.

Entries will be added to this JSON structure for each bar that is selected, along with its corresponding ID provided in memberValue.

In the JSON of FIG. 16, the ID mentioned under parentKey, such as "planning:[TENANT_TEST][ ][Vsap.epm-VProfitAndLoss_qs]", identifies the customer's data source that applies to this bar, in the event that multiple data sources are used. The "hierarchy.pch" is additional metadata indicating the data source is a hierarchy using a parent-child-hierarchy type.

Examples—Waterfall Charts

Chart axis breaks may be implemented in waterfall charts as well as bar charts. Sample data for a waterfall chart in this example are provided in the following table.

| Year | Quarter | Sales |
|---|---|---|
| 2014 | 1 | 100 |
| 2014 | 2 | 50 |
| 2014 | 3 | −70 |
| 2014 | 4 | 30 |
| 2015 | 1 | 10 |
| 2015 | 2 | 150 |
| 2015 | 3 | −60 |
| 2015 | 4 | 30 |

Figure 17:
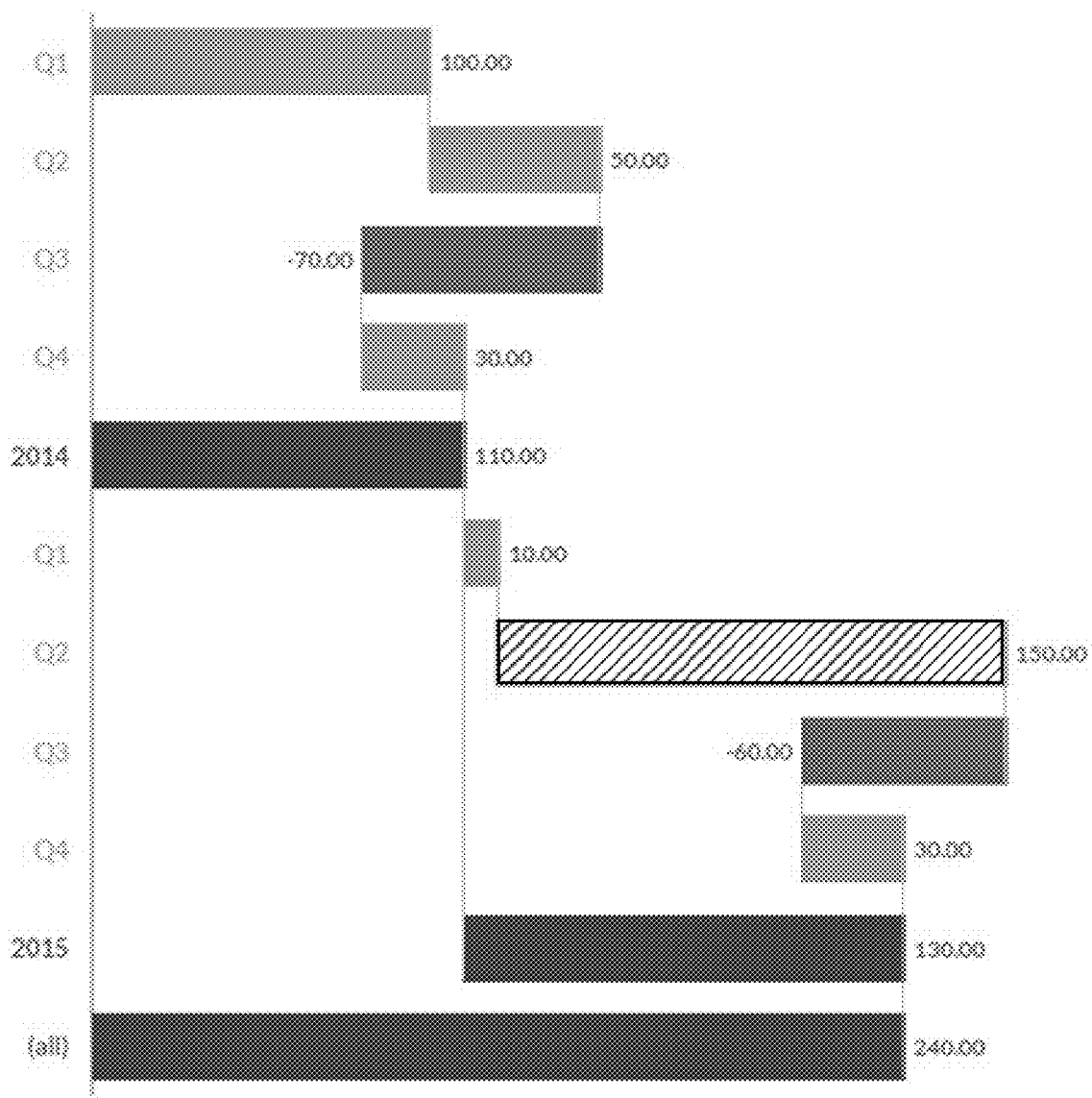

FIG. 17 shows the corresponding original waterfall chart visualization without any axis breaks added.

Figure 18:
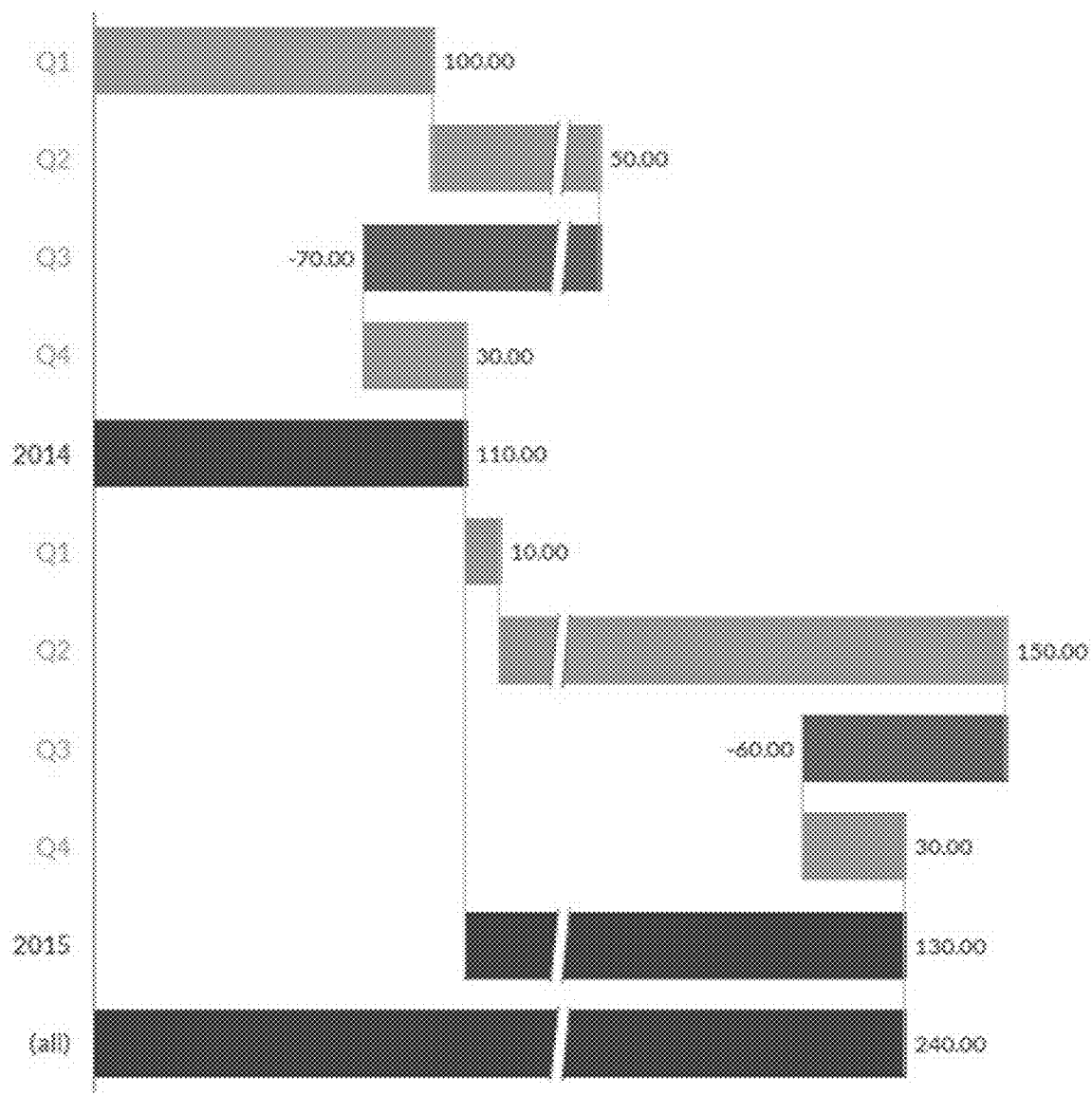

A scenario is now described in connection with FIGS. 17-18 for imposing a break in a waterfall chart, where the user selects a bar having other bars overlapping. FIG. 17 shows the user selecting the single bar Q2 2015.

The procedure determines the bar Q2 2015 as the bar B1. The lowest value of that bar bottom(B1)=120 and the highest value of that bar top(B1)=270.

Starting from the lower value of 120, the procedure searches upwards for the nextmost end of another bar that is also overlapping B1. Those bars are Q2 2014 and Q3 2014, which end at 150. Therefore D1'=150.

Starting from the upper value of 270, the procedure searches downwards towards zero for the nextmost end of another bar that is also overlapping B1. That bar is Q4 2015, which ends at 240. Therefore D2'=240.

The distances are accordingly calculated as follows:
the distance from D1' to bottom(B1)=150−120=30.
the distance from D2' to top(B1)=270−240=30.

The first distance (30) is the same as the second distance (30). So, the axis break could be inserted at either end of B1. Here the end closer to zero is selected, but either end could have been chosen.

The break is inserted from min to max, where min=0+padding, and max=150−padding, where padding is a certain percentage of the chart's axis range. FIG. 18 shows the resulting waterfall chart rendered with the axis broken.

Figure 19:
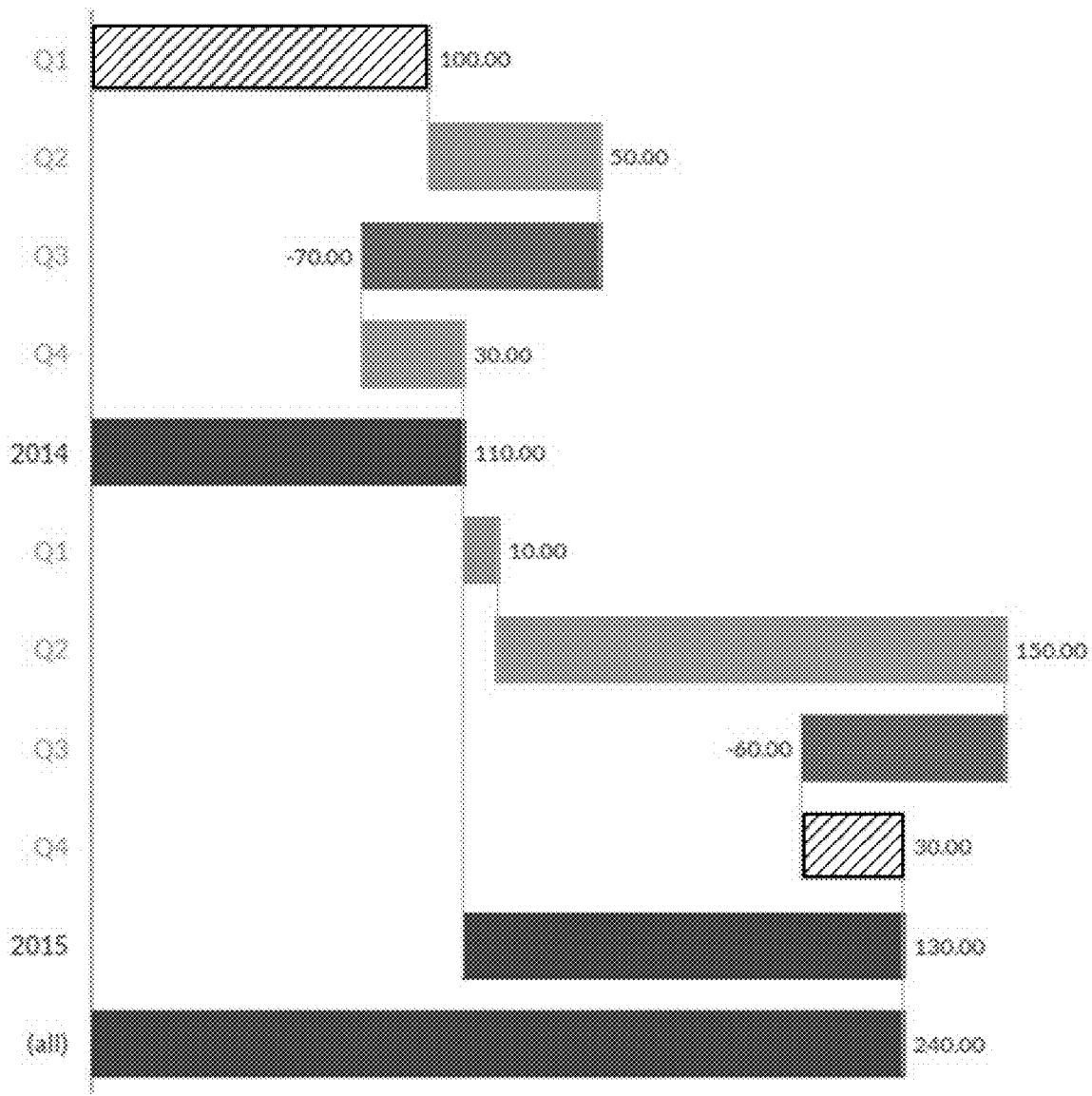
Figure 20:
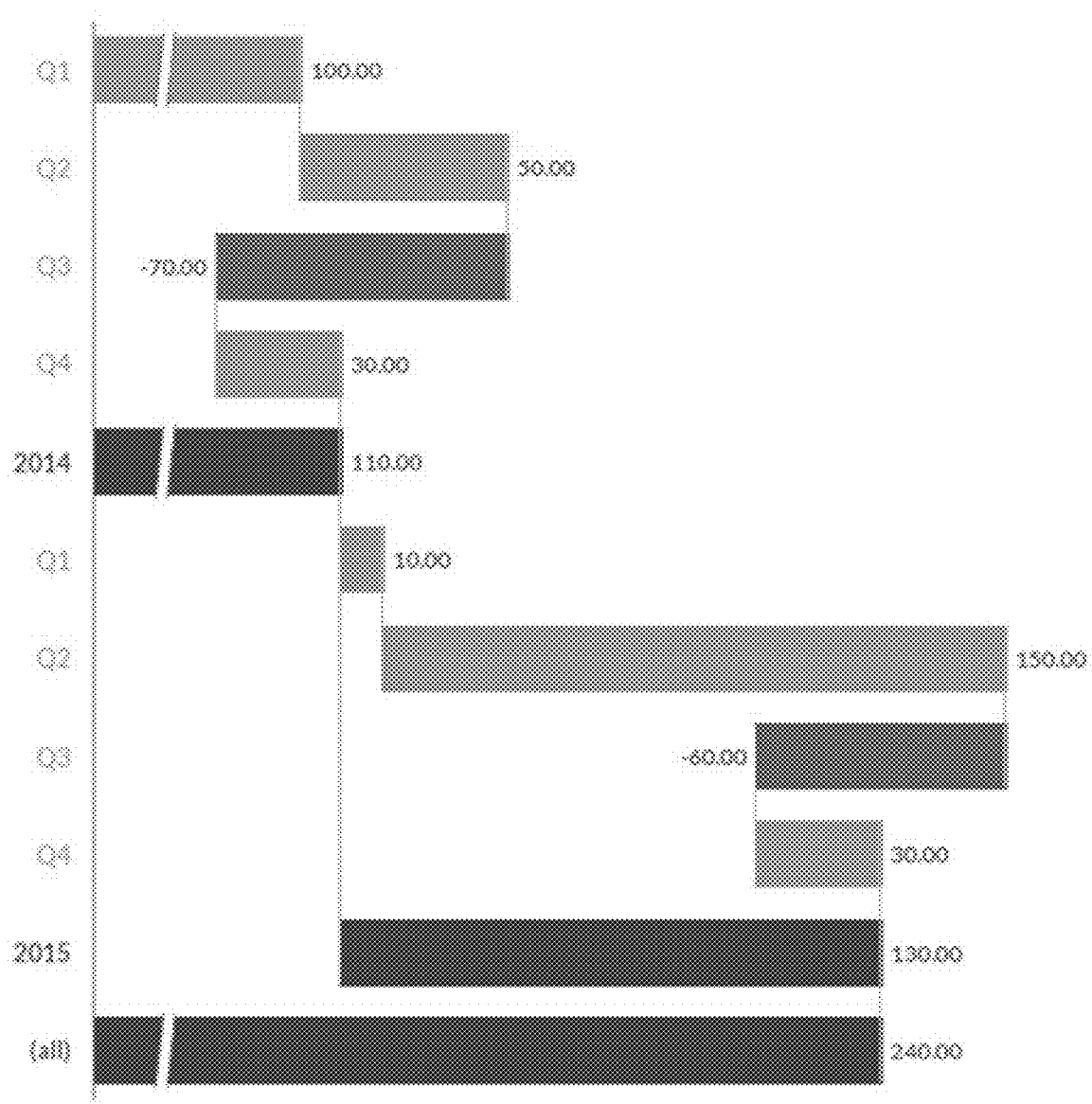

FIGS. 19-20 show a different scenario in which a user seeks to impose a chart axis break by selecting two bars which do not overlap. FIG. 19 shows the user selecting the bar Q1 2014 and the bar Q4 2015.

The procedure starts with the biggest bar: Q1 2014. The data is checked to if any other selected bar is overlapping with this bar.

Since the other selected bar Q4 2015 does not overlap with Q1 2014, the region of the largest bar that overlaps with all possible other selected bars (B2), is identical to the entire bar for Q1 2014.

As in the first scenario above, the procedure is then run using B2 as the region to search for a break. Here, the Bottom(B2)=0 and the top(B2)=100.

Starting from 0, the procedure searches upwards for the nextmost end of another bar that is also overlapping B2. Those bars are Q3 2014 and Q4 2014 which both end at 80. Therefore, here the value of D1'=80.

Then, starting from 100, the procedure searches towards zero for the nextmost end of another bar that is also overlapping B2. That is also bars Q3 2014 and Q4 2014, which end at 80. Therefore the value of D2'=80.

The resulting distances are calculated by the procedure as follows:
the distance from D1 to bottom(B2)=80−0=80
the distance from D2 to top(B2)=100−80=20.

The first distance (80) is bigger than the second distance (20), so the procedure inserts the break from min to max where min=0+padding, and max=80−padding, where padding is a certain percentage of the chart's axis range. FIG. 20 shows the resulting waterfall chart rendered with the axis broken.

Figure 21:
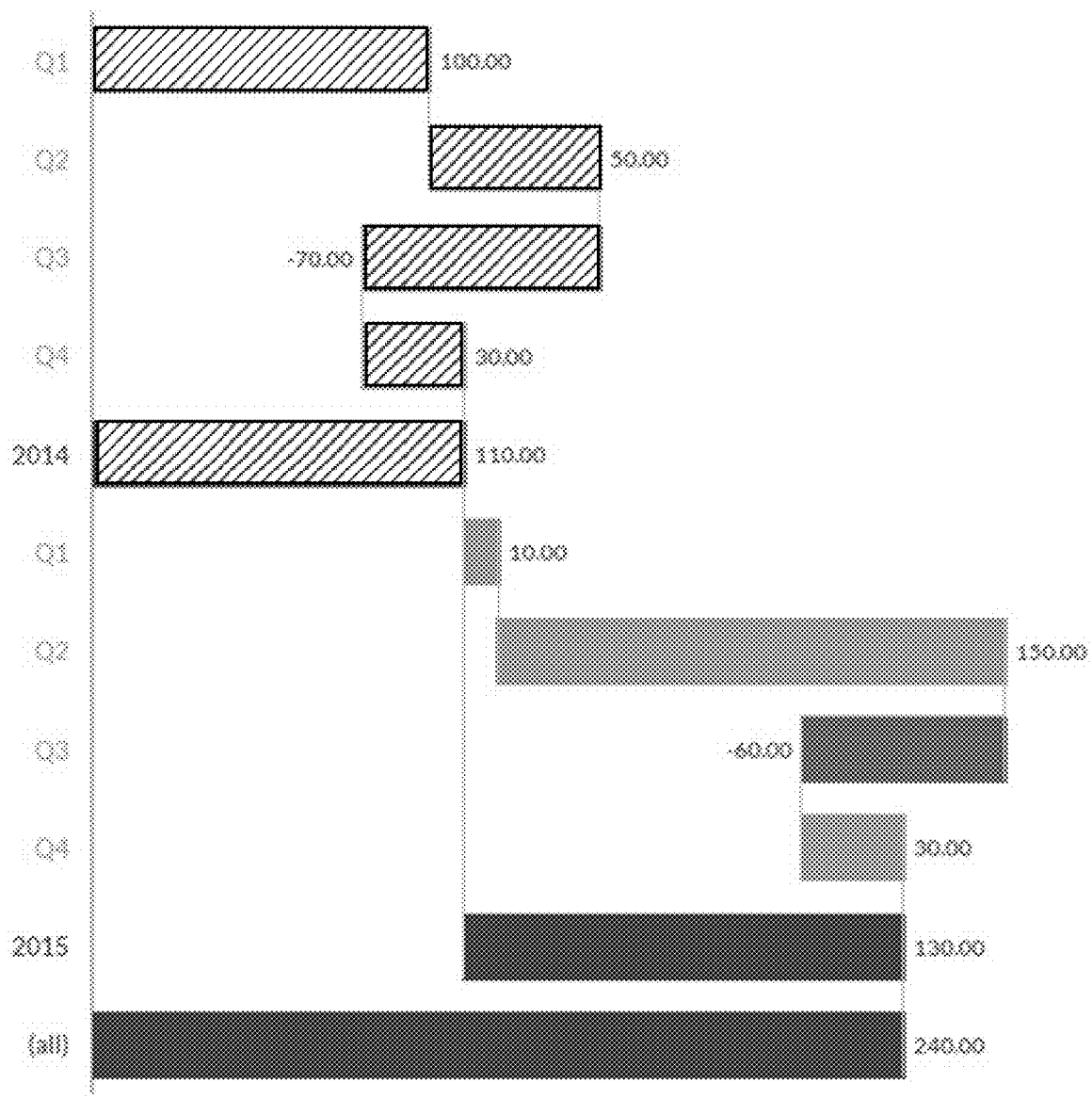
Figure 22:
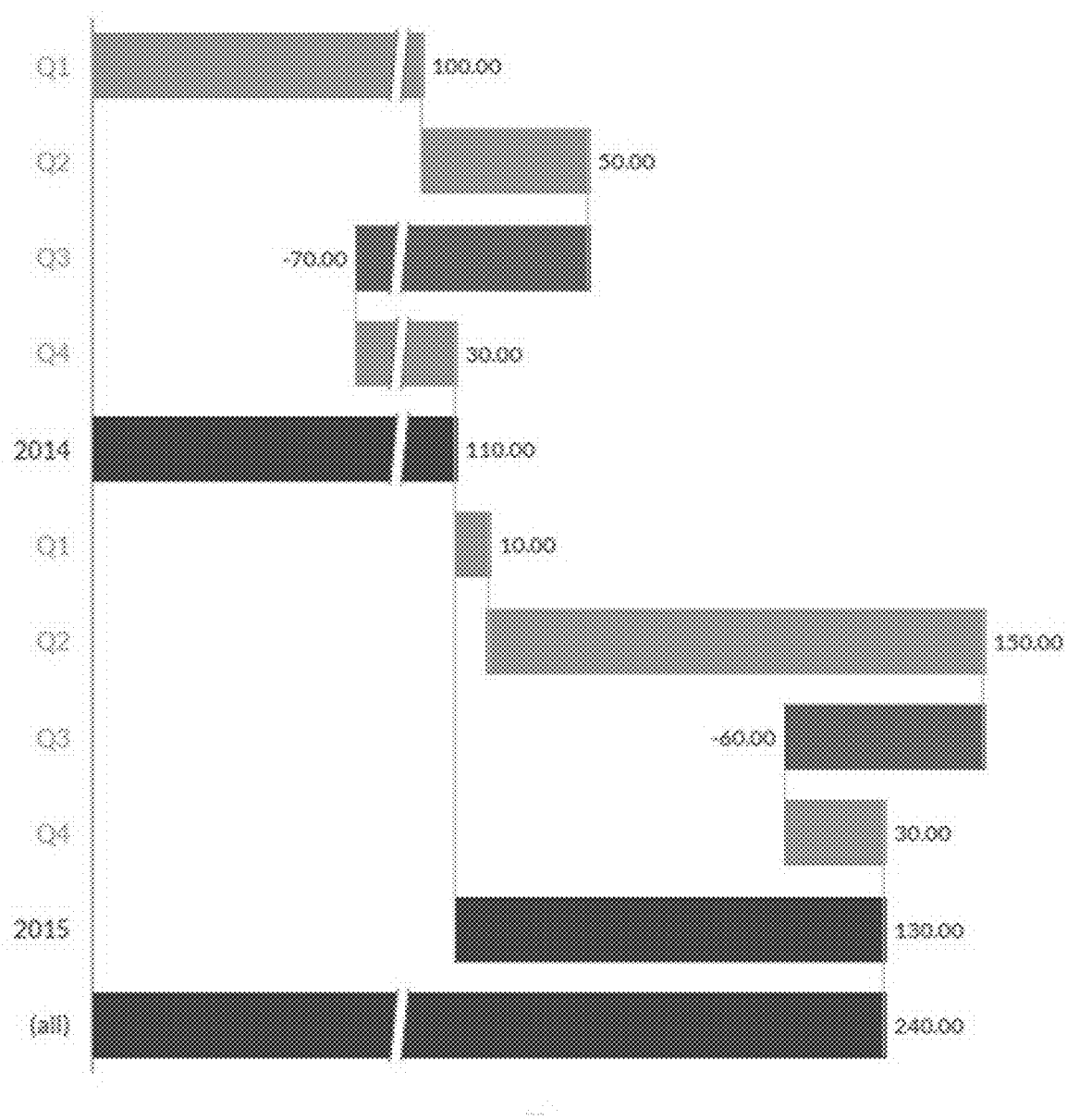

Another scenario involving the selection of multiple waterfall chart bars is now described in connection with FIGS. 21-22. A shown in FIG. 21, five (5) bars are selected: Q1 2014; Q2 2014; Q3 2014; Q4 2014; and 2014.

The procedure starts with the largest bar, which is 2014. It is determined if any other selected bar is overlapping with this bar. Here, all of the other selected bars overlap with this bar.

Out of all the selected bars overlapping with 2014, the procedure identifies the one with the largest size. Here, that bar is Q1 2014.

Next, the procedure finds the overlapping region between 2014 and Q1 2014. This is the region from 0 to 100.

The procedure then identifies any remaining selected bars overlapping with this region 0-100. Here, this includes bars Q3 2014 and Q4 2014. (Bar Q2 2014 does not overlap the region 0 to 100, so it is now excluded.) Out of the two bars Q3 2014 and Q4 2014, the largest one (Q3 2014) is chosen by the procedure.

The procedure now finds the region that is overlapping between 0 to 100 and Q3 2014. This region is from 80 to 100.

The procedure next considers the region 80 to 100 to determine if any remaining selected bars overlap with that region. The only remaining selected bar is Q4 2014, which overlaps the entire region 80 to 100.

No selected bars remain. The procedure has now calculated the region of the largest bar (B2) that overlaps with all possible other selected bars, to be the region 80 to 100.

The procedure is now run using the bar B2 as the region to search for a break on (as with the first scenario above). This produces a bar Bottom(B2)=80 and a bar top(B2)=100.

Starting from 80, the procedure searches upwards for the nextmost end of another bar that is also overlapping B2. Here, there are no other bars which end within the region 80 to 100. Therefore D1'=100.

Starting from 100, the procedure searches toward zero for the nextmost end of another bar that is also overlapping B2. Here, there are no other bars which end within the region 80 to 100. Therefore D 2'=80.

Accordingly, the distances are calculated as follows:
distance from D1' to bottom(B2)=100−80=20
distance from D2' to top(B2)=100−80=20.

The distances D1' and D2' are the same. Thus the break could be inserted at either end of the bar B2. Here the end closer to zero is chosen, but either end could alternatively have been chosen (and would yield the same results).

The procedure inserts the break from min to max, where min=80+padding, and max=100−padding, where padding is a certain percentage of the chart's axis range. FIG. 22 shows the resulting waterfall chart rendered with the axis broken.

Workflows implementing axis breaks with drill-down/up user interaction with a waterfall chart, are now described. FIG. 23 shows a waterfall chart based on income statement. Income statement is an account comprising several child accounts (e.g., Taxes, General and Administrative Expenses, Cost of Goods Sold, etc.) which contribute to the total income statement.

A bar such as Cost of Goods Sold, can also have its own children, e.g., Cost of Product and Other Cost of Goods Sold. Every bar, regardless of whether it is a child or a parent bar, has a unique identifier, e.g.: "[sap.epm:Account].[parentId].&[COGS]" for Cost of Goods Sold, and "[sap.epm:Account].[parentId].&[INCOME_STMT]", for Income Statement.

In this workflow, the user first drills down on the "Cost of Goods Sold" bar. The resulting waterfall chart of FIG. 24 shows the child bars "Cost of Product" and "Other Cost of Goods Sold".

Figures 25, 26:
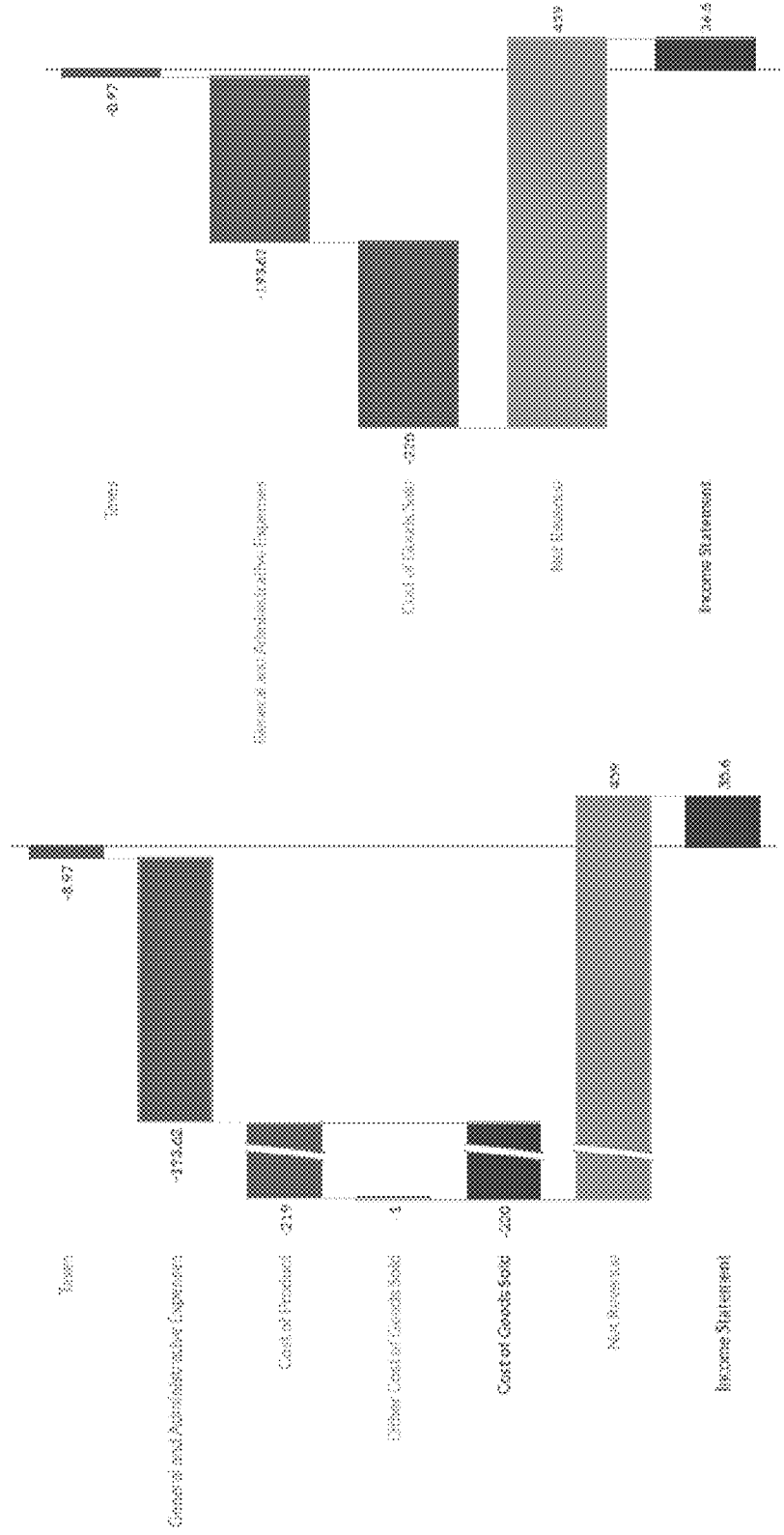

Next, the user selects the Cost of Product bar, which has ID "[sap.epm:Account].[parentId].&[COSTOFPROD]", and chooses the Apply Axis Break option from the menu. The axis break procedure is then run with that bar/ID as a basis for its selection, and the axis break is inserted into the chart as shown in FIG. 25.

Now the user selects the drill up option on the Cost of Goods Sold bar. FIG. 26 shows the result, with the Cost of Product child bar is no longer visible. The axis break selection contains only the single ID that was selected previously: "[sap.epm:Account].[parentId].&[COSTOFPROD]".

This bar is no longer visible in the chart, and the axis break selection does not contain any other bars that are visible in the chart. Therefore the chart is rendered in FIG. 26 without any axis break showing. However, the previous selection "[sap.epm:Account].[parentId].&[COSTOFPROD]" remains associated with the visualization when the story is saved, even though no axis break is currently rendered on the chart of FIG. 26.

If the user elects to drills down on the Cost of Goods Sold bar, the Cost of Product bar will again be visible again in the chart. The Cost of Product bar retains its unique ID: "[sap.epm:Account].[parentId].&[COSTOFPROD]", and this ID is remain present in the axis break selection of the visualization's state as established by the original "Apply Axis Break".

Therefore, since the Axis Break selection contains the ID: "[sap.epm:Account].[parentId].&[COSTOFPROD]", and the chart now includes a bar with this ID, the Axis Break procedure will be run using this bar as selection input. The Axis Break will be calculated and inserted into the chart as shown above in FIG. 25.

Returning now to the original waterfall chart of FIG. 23, second workflow is now illustrated. Here, the user has cleared an axis break such that the axis break selection no longer contains any Bar ID's. The user selects the Cost of Goods Sold bar, and clicks Apply Axis Break The axis break selection stored with the chart is updated to contain the ID of the Cost of Goods Sold bar: "[sap.epm:Account].[parentId].&[COGS]". Since the chart contains a bar with this ID, running the axis break procedure inserts a break into the chart as shown in FIG. 27.

Now the user clicks on the Cost of Goods Sold bar, and chooses the drill down option to expose the children of that bar. The Cost of Goods Sold bar remains visible, retaining its ID: "[sap.epm:Account].[parentId].&[COGS]".

Since the axis break selection contains this ID of a bar currently visible chart, running the axis break procedure imposes an axis break as shown in FIG. 28.

Now the user clicks on the child bar (Cost of Product), and selects a further drill down option. The child bars of Cost of Product (having their own unique bar ID's), are added to the chart above Cost of Product.

The axis break selection still contains the ID: "[sap.epm: Account].[parentId].&[COGS]" corresponding to the Cost of Goods Sold bar visible in the chart. The axis break procedure thus receives this selection as input, and the axis break is calculated and inserted into the chart as shown in FIG. 29.

Returning to FIG. 8, while that figure shows the visualization engine as part of the application layer, this is not required. In certain embodiments the visualization engine could be implemented with a database engine, for example the powerful in-memory database engine of an in-memory database comprising random access memory. One example of such an in-memory database is the HANA in-memory database available from SAP SE of Walldorf, Germany.

Figures 29, 30:
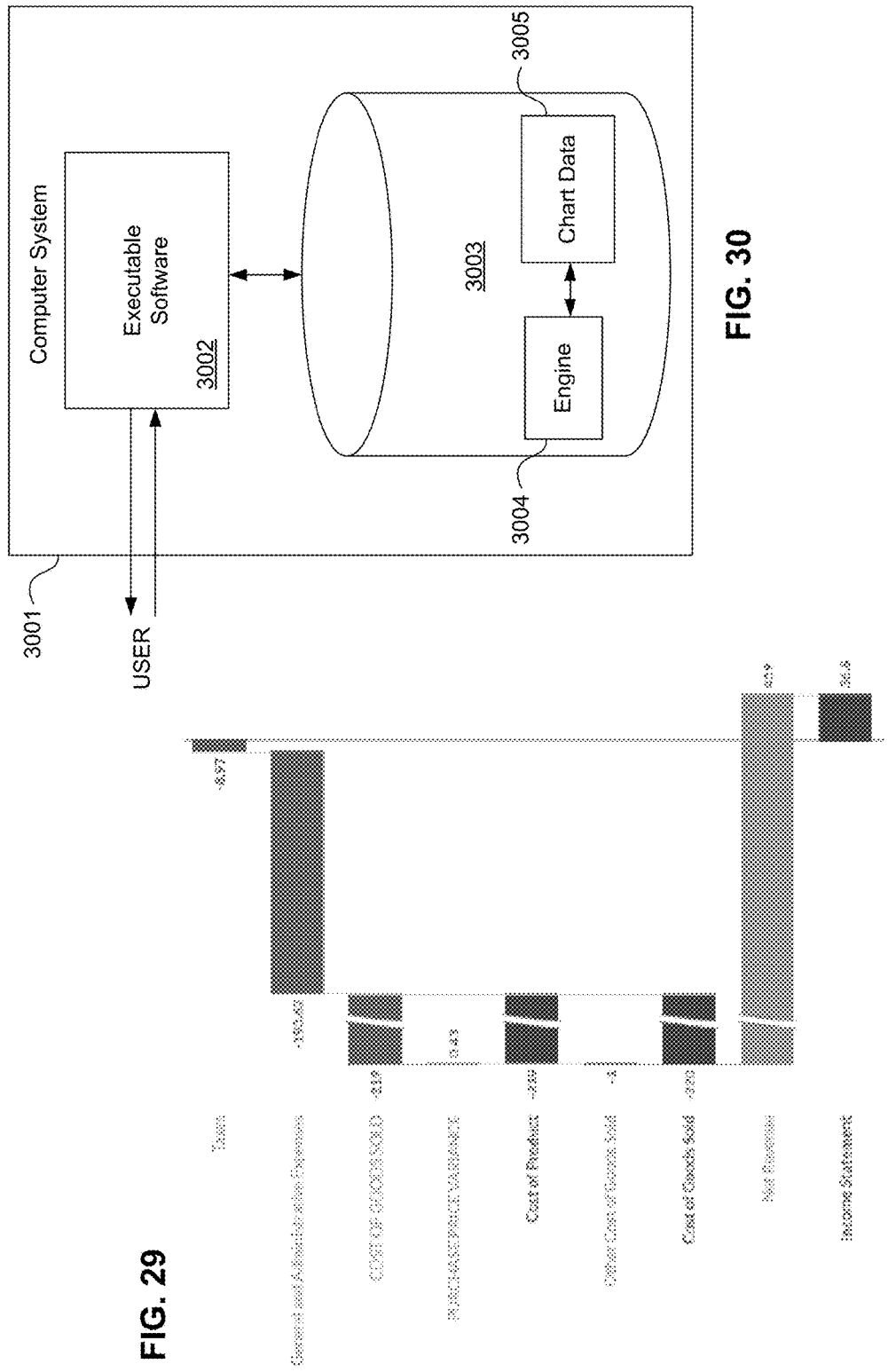

For example, FIG. 30 illustrates hardware of a special purpose computing machine configured to create chart axis breaks according to an embodiment. In particular, computer system 3001 comprises a processor 3002 that is in electronic communication with a non-transitory computer-readable storage medium 3003. This computer-readable storage medium has stored thereon code 3005 corresponding to chart data. Code 3004 corresponds to a visualization engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 30, the engine is shown as being part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 1) the engine may be implemented in other ways, for example as part of an overlying application layer.

Figure 31:
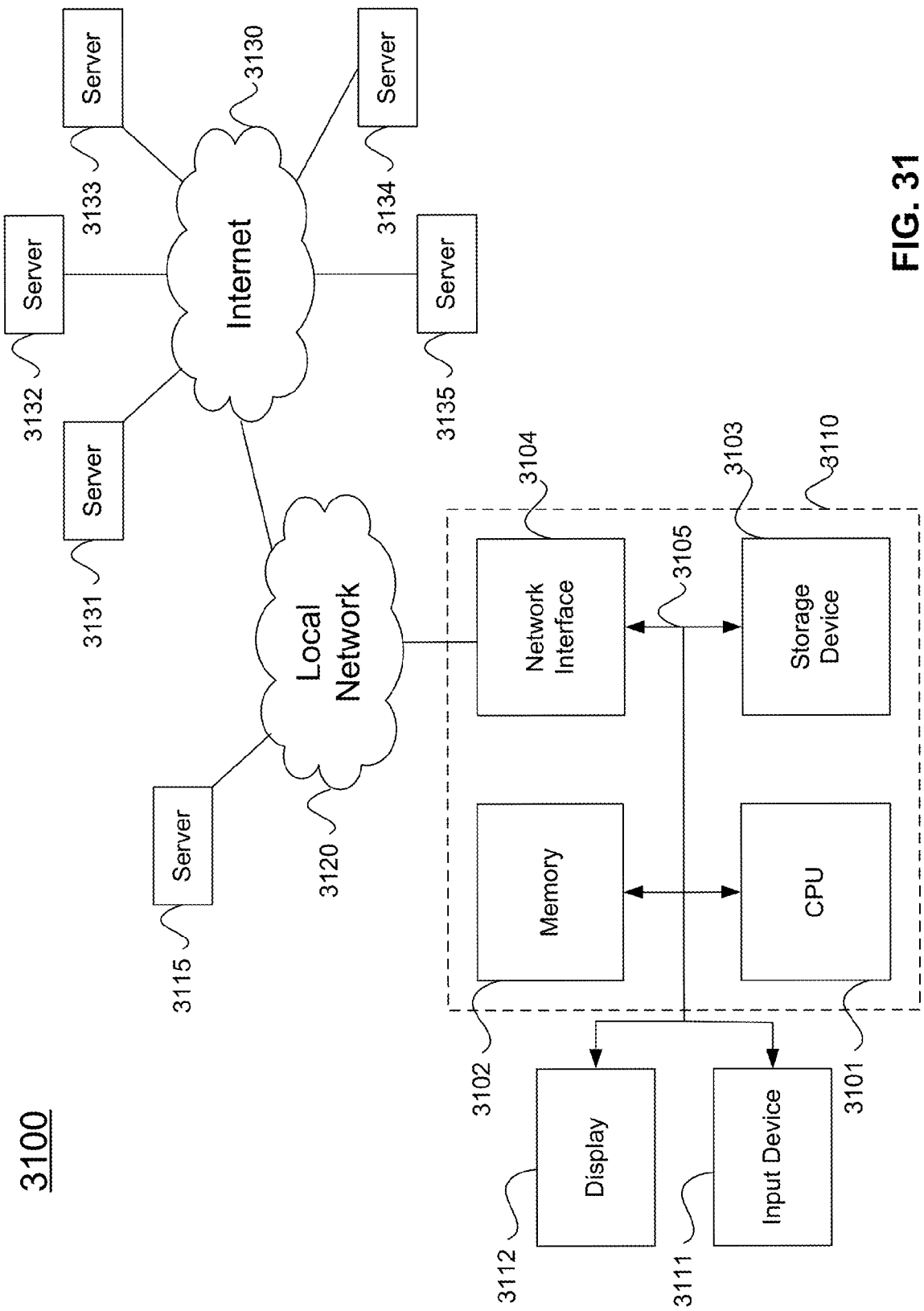
FIG. 31 illustrates an example computer system.

An example computer system 3100 is illustrated in FIG. 31. Computer system 3110 includes a bus 3105 or other communication mechanism for communicating information, and a processor 3101 coupled with bus 3105 for processing information. Computer system 3110 also includes a memory 3102 coupled to bus 3105 for storing information and instructions to be executed by processor 3101, including information and instructions for performing the techniques described above, for example. This memory may also be used for storing variables or other intermediate information during execution of instructions to be executed by processor 3101. Possible implementations of this memory may be, but are not limited to, random access memory (RAM), read only memory (ROM), or both. A storage device 3103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 3103 may include source code, binary code, or software files for performing the techniques above, for example. Storage device and memory are both examples of computer readable mediums.

Computer system 3110 may be coupled via bus 3105 to a display 3112, such as a cathode ray tube (CRT) or liquid crystal display (LCD), for displaying information to a computer user. An input device 3111 such as a keyboard and/or mouse is coupled to bus 3105 for communicating information and command selections from the user to processor 3101. The combination of these components allows the user to communicate with the system. In some systems, bus 3105 may be divided into multiple specialized buses.

Computer system 3110 also includes a network interface 3104 coupled with bus 3105. Network interface 3104 may provide two-way data communication between computer system 3110 and the local network 3120. The network interface 3104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 3104 sends and receives electrical, electromagnetic, or optical signals that carry digital data streams representing various types of information.

Computer system 3110 can send and receive information, including messages or other interface actions, through the network interface 3104 across a local network 3120, an Intranet, or the Internet 3130. For a local network, computer system 3110 may communicate with a plurality of other computer machines, such as server 3115. Accordingly, computer system 3110 and server computer systems represented by server 3115 may form a cloud computing network, which may be programmed with processes described herein. In the Internet example, software components or services may reside on multiple different computer systems 3110 or servers 3131-3135 across the network. The processes described above may be implemented on one or more servers, for example. A server 3131 may transmit actions or messages from one component, through Internet 3130, local network 3120, and network interface 3104 to a component on computer system 3110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing in an in-memory database, a database table of a waterfall chart having an axis and comprising a plurality of bars and corresponding per-bar identifiers;
receiving a first input to select a plurality of overlapping bars;

in response to the first input, storing in the database table an axis break selection comprising per-bar identifiers of the plurality of bars;

an engine of the in-memory database referencing the per-bar identifiers of the axis break selection to automatically determine a region of greatest overlap, wherein determining the region of greatest overlap comprises:

the engine successively calculating in an iterative manner, a plurality of overlap regions between each of the plurality of selected bars from largest to smallest and all of the other selected bars, corresponding to the per-bar identifiers;

the engine determining a largest of the plurality of overlap regions as the region of greatest overlap; and the engine rendering between a padding on a top and on a bottom of a largest selected bar, an axis break corresponding to the region of greatest overlap.

2. A method as in claim 1 further comprising:
in response to a second input to the second waterfall chart, rendering a third waterfall chart lacking the largest bar; and
in response to a third input to the third waterfall chart restoring the largest bar, referencing the axis break selection to render a fourth waterfall chart with the axis break.

3. A method as in claim 2 wherein the second input comprises a filtering.

4. A method as in claim 2 wherein the second input comprises a drill-down.

5. A method as in claim 1 further comprising:
in response to a second input to the second waterfall chart, rendering a third waterfall chart lacking the largest bar; and
referencing the per-bar identifier of a next largest bar of the axis break selection to determine new axis break in the third waterfall chart based upon a new region of greatest overlap with the next largest bar.

6. A method as in claim 1 further comprising the engine determining the padding as a percentage of a length of the axis.

7. A method as in claim 1 further comprising:
updating the database table with changed data;
recalculating a new axis break from the changed data based upon the axis break selection; and
rendering a third waterfall chart including the new axis break.

8. A non-transitory computer readable storage medium embodying a computer program for performing a method, said method comprising:
providing in an in-memory database, a database table of a waterfall chart having an axis and comprising a plurality of bars and corresponding per-bar identifiers;
receiving a first input to select a plurality of overlapping bars;
in response to the first input, storing in the database table an axis break selection comprising per-bar identifiers of the one or more bars;
an engine of the in-memory database referencing the per-bar identifiers of the axis break selection to automatically determine a region of greatest overlap, wherein determining the region of greatest overlap comprises:
the engine successively calculating in an iterative manner, a plurality of overlap regions between each of the plurality of selected bars from largest to smallest and all of the other selected bars, corresponding to the per-bar identifiers;
the engine determining a largest of the plurality of overlap regions as the region of greatest overlap; and
the engine rendering between a padding on a top and on a bottom of a largest selected bar, an axis break corresponding to the region of greatest overlap.

9. A non-transitory computer readable storage medium as in claim 8 wherein the method further comprises:
in response to a second input, rendering a third bar chart removing the one or more bars; and
in response to a third input, rendering a fourth bar chart restoring the one or more bars and including the axis break determined from per-bar identifiers.

10. A non-transitory computer readable storage medium as in claim 8 wherein the padding comprises a percentage of a length of the axis.

11. A non-transitory computer readable storage medium as in claim 8 wherein the method further comprises:
updating the database table with changed data;
recalculating a new axis break from updated data of the database table; and
rendering a third bar chart including the new axis break.

12. A non-transitory computer readable storage medium as in claim 8 wherein the method further comprises:
in response to a second input, rendering a third bar chart removing the one or more bars; and
in response to a third input, rendering a fourth bar chart restoring fewer than the one or more bars and including a new axis break determined from the per-bar identifiers.

13. A computer system comprising:
one or more processors;
a software program, executable on said computer system, the software program configured to cause an in-memory database engine to:
store in an in-memory database, a database table of a waterfall chart having an axis and comprising a plurality of bars and corresponding per-bar identifiers;
receive an input comprising a selection of one or more bars of the waterfall chart, wherein the selection comprises a plurality of overlapping bars;
store in the database table, per-bar identifiers of the selection;
reference the per-bar identifiers of the axis break selection to automatically determine a region of greatest overlap, the software further configured to cause the in-memory database engine to identify the region of greatest overlap by,
successively calculating in an iterative manner, a plurality of overlap regions between each of the plurality of selected bars from largest to smallest and all of the other selected bars, corresponding to the per-bar identifiers; and
determining a largest of the plurality of overlap regions as the region of greatest overlap; and
render between a padding on a top and on a bottom of a largest selected bar, an axis break corresponding to the region of greatest overlap.

14. A computer system as in claim 13 wherein the software is further configured to cause the in-memory database engine to determine the padding as a percentage of a length of the axis.

15. A computer system as in claim 13 wherein the software is further configured to cause the in-memory database engine to persist in the in-memory database, the selection including the per-bar identifiers for recall in response to a user interaction removing the one or more bars.

16. A computer system as in claim 13 wherein the software is further configured to cause the in-memory database engine to automatically,
   recalculate a new axis break from updated data of the database table by referencing the per-bar identifiers; and
   render a third waterfall chart including the new axis break.

* * * * *